(12) United States Patent
Seto

(10) Patent No.: US 11,797,857 B2
(45) Date of Patent: Oct. 24, 2023

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Hidekazu Seto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 16/950,232

(22) Filed: Nov. 17, 2020

(65) Prior Publication Data

US 2021/0158092 A1   May 27, 2021

(30) Foreign Application Priority Data

Nov. 25, 2019   (JP) ................................. 2019-212299
Nov. 25, 2019   (JP) ................................. 2019-212526

(51) Int. Cl.
*G06N 3/08*    (2023.01)
*G06N 3/084*   (2023.01)
(Continued)

(52) U.S. Cl.
CPC ........... *G06N 3/084* (2013.01); *G06F 18/214* (2023.01); *G06F 18/40* (2023.01); *G06K 7/1417* (2013.01);
(Continued)

(58) Field of Classification Search
CPC ........ G06N 3/084; G06N 20/00; G06N 3/045; G06N 3/08; G06F 18/214; G06F 18/40;
(Continued)

(56) References Cited

U.S. PATENT DOCUMENTS 8,331,739 B1 * 12/2012 Abdulkader ......... G06V 30/248
                                                    358/1.11
2011/0216337 A1 * 9/2011 Ito ...................... H04N 1/00127
                                                    358/1.13
(Continued)

FOREIGN PATENT DOCUMENTS

CN   101542468 A   9/2009
CN   102142962 A   8/2011
(Continued)

OTHER PUBLICATIONS

Shen et al.; "Detection of Original Resolution Tampering in Digital Result of Paper Records"; China Academic Journal Elecronic Publishing House; 2nd term, Apr. 28, 2017; pp. 106-110.
(Continued)

*Primary Examiner* — Neil R McLean
(74) *Attorney, Agent, or Firm* — Canon U.S.A., Inc. IP Division

(57) ABSTRACT

To reduce the possibility of false determination for a character string alteration in image data, embodiments of the present disclosure include a generation unit configured to generate a learning model by performing machine learning processing based on an altered character image, a character image before an alteration, and an image representing the difference between the altered character image and the character image before the alteration, an input unit configured to input image data, and an estimation unit configured to estimate whether the image data input by the input unit includes an altered character, by using the learning model generated by the generation unit.

16 Claims, 17 Drawing Sheets

(51) Int. Cl.
*G06N 20/00* (2019.01)
*G06K 7/14* (2006.01)
*G06V 30/32* (2022.01)
*G06F 18/214* (2023.01)
*G06F 18/40* (2023.01)
*G06V 10/764* (2022.01)
*G06V 10/82* (2022.01)
*G06V 10/44* (2022.01)
*G06V 10/24* (2022.01)
*G06V 30/413* (2022.01)
*H04N 1/00* (2006.01)

(52) U.S. Cl.
CPC .......... *G06N 20/00* (2019.01); *G06V 10/245* (2022.01); *G06V 10/454* (2022.01); *G06V 10/764* (2022.01); *G06V 10/82* (2022.01); *G06V 30/32* (2022.01); *G06V 30/413* (2022.01); *H04N 1/00795* (2013.01); *H04N 2201/0094* (2013.01)

(58) Field of Classification Search
CPC . G06F 18/2413; G06F 18/241; G06K 7/1417; G06V 10/245; G06V 10/454; G06V 10/764; G06V 10/82; G06V 30/32; G06V 30/413; G06V 20/62; G06V 30/10; H04N 1/00795; H04N 2201/0094; H04N 1/00408
USPC .......................................................... 382/159
See application file for complete search history.

(56) References Cited

U.S. PATENT DOCUMENTS

| 2015/0269719 | A1* | 9/2015 | Kitai ....................... G06T 7/001 358/474 |
| 2018/0107887 | A1 | 4/2018 | Huber et al. |
| 2018/0108122 | A1* | 4/2018 | Fukase ..................... G06T 7/12 |
| 2020/0082218 | A1* | 3/2020 | Hoehne ............ G06V 30/19173 |

FOREIGN PATENT DOCUMENTS

| CN | 102194092 A | 9/2011 |
| CN | 106033543 A | 10/2016 |
| CN | 107657259 A | 2/2018 |
| CN | 110110788 A | 8/2019 |
| JP | 2006121310 A | 5/2006 |
| JP | 2009-200794 A | 9/2009 |
| JP | 2010-003301 A | 1/2010 |

OTHER PUBLICATIONS

Kong; "Research on Digital Forensic Techniques and Tools in Image Mode"; China Science and Technology Achievements; Mar. 5, 2012; pp. 18-19.

Roy et al.; "Forensic Performance on Handwriting to Identify Forgery Owing to Word Alteration"; IEEE; 2019 IEEE 5th International Conference on Identity, Security, and Behavior Analysis (ISBA); Jul. 29, 2019; pp. 1-9.

* cited by examiner

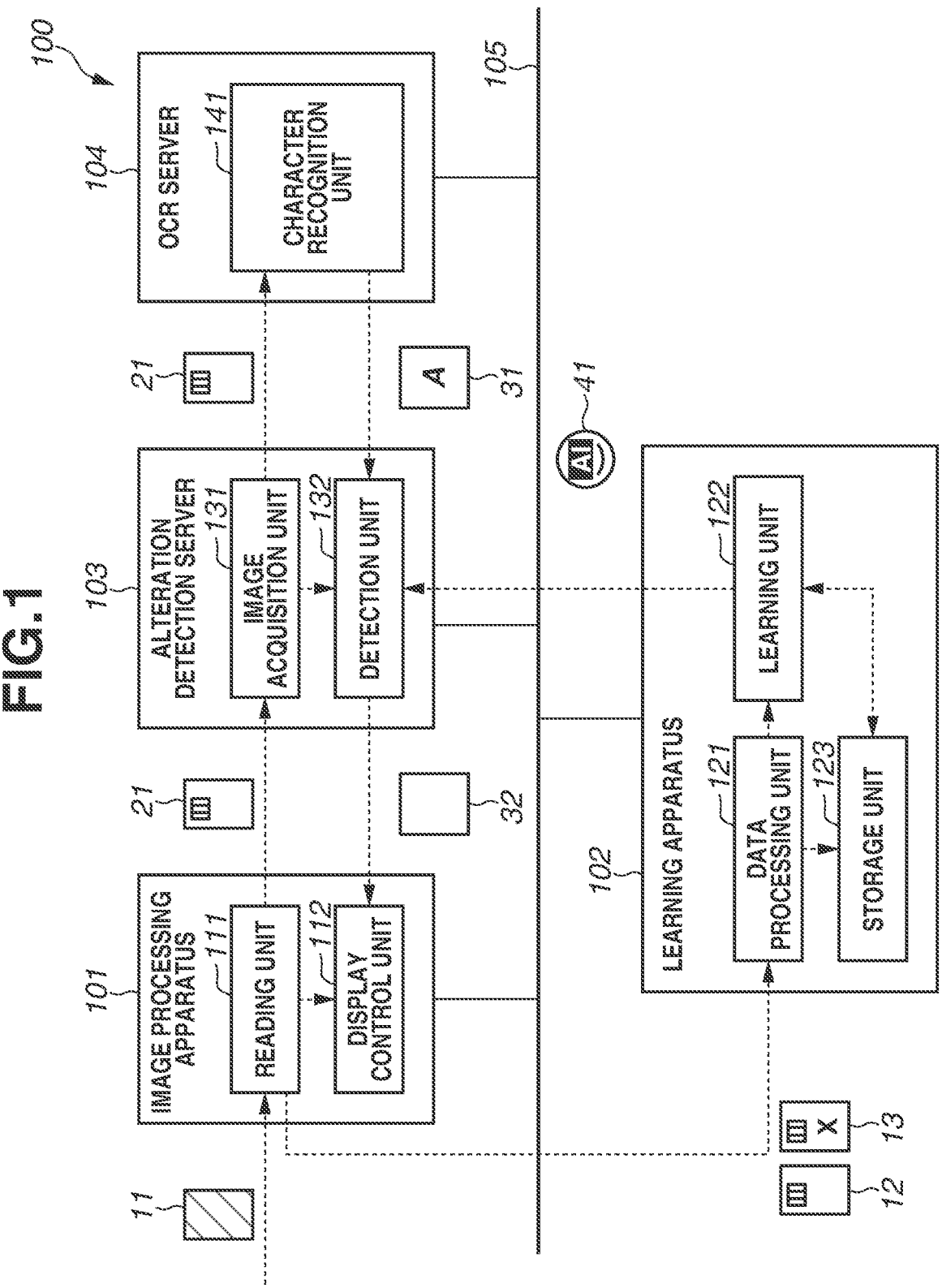

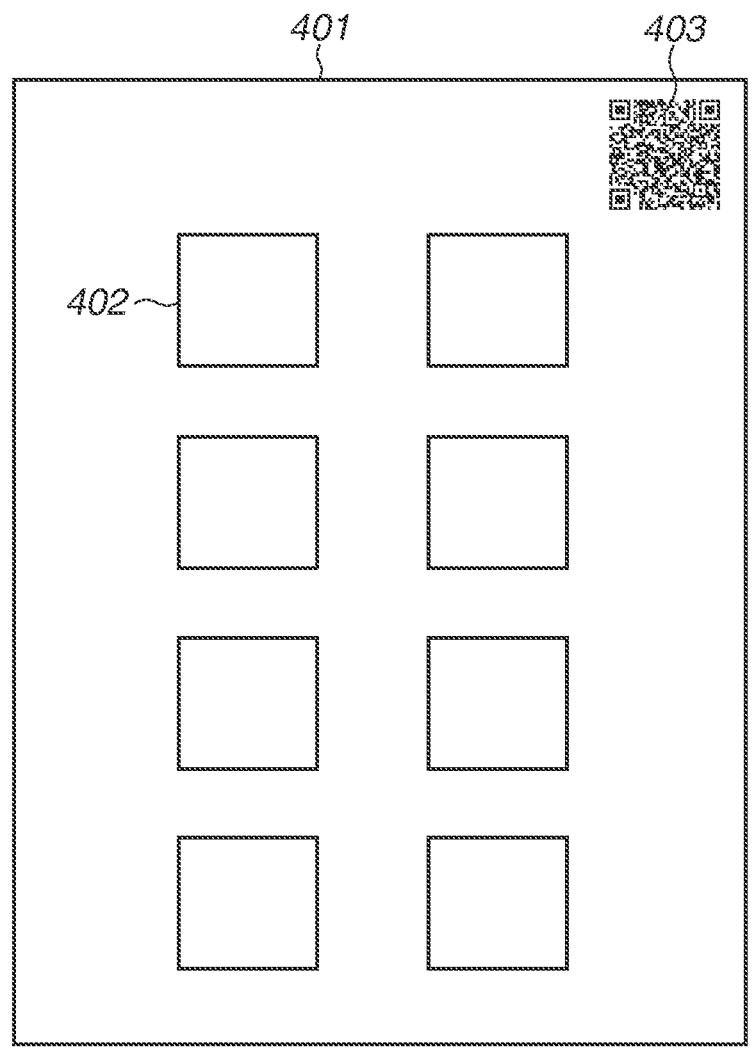

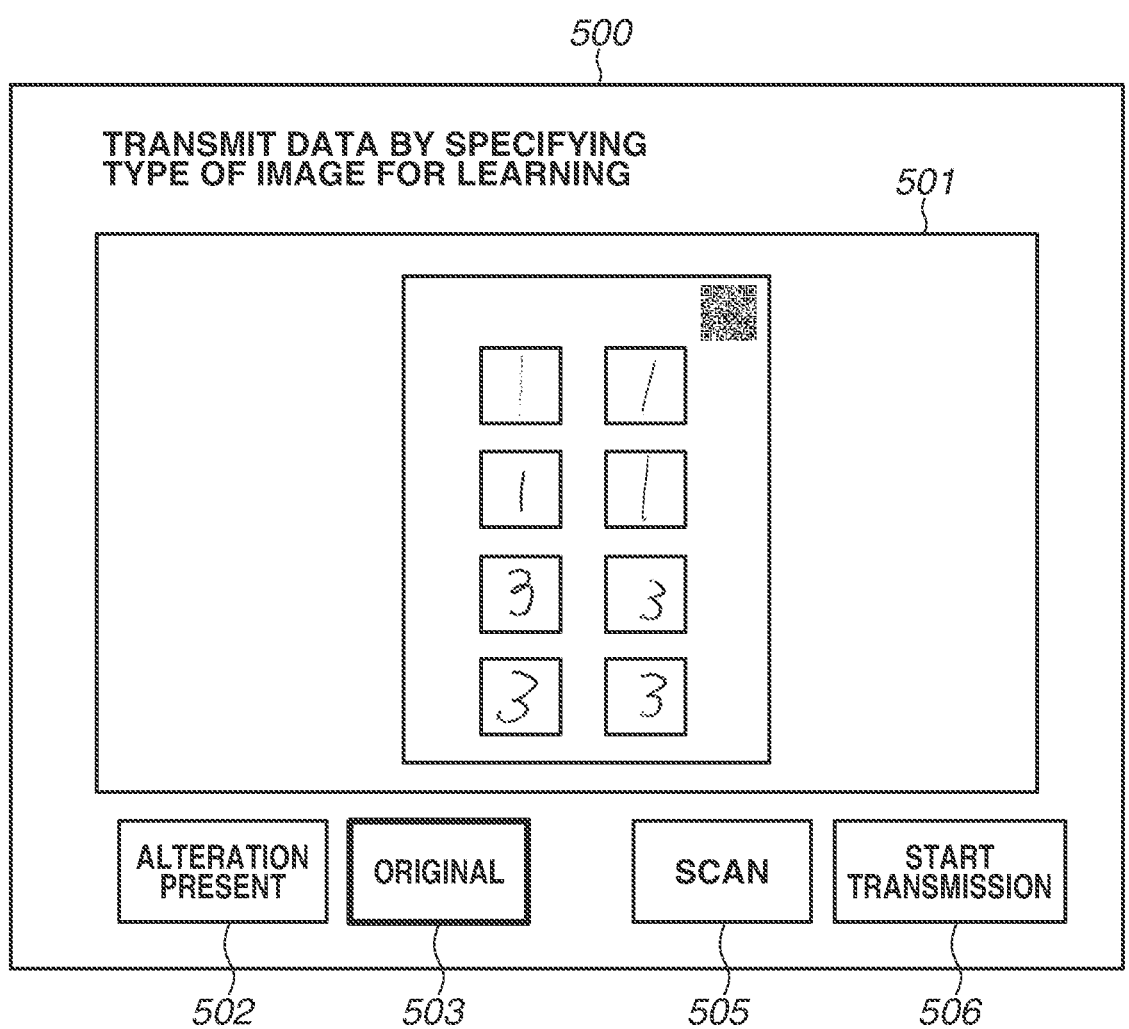

FIG.6A
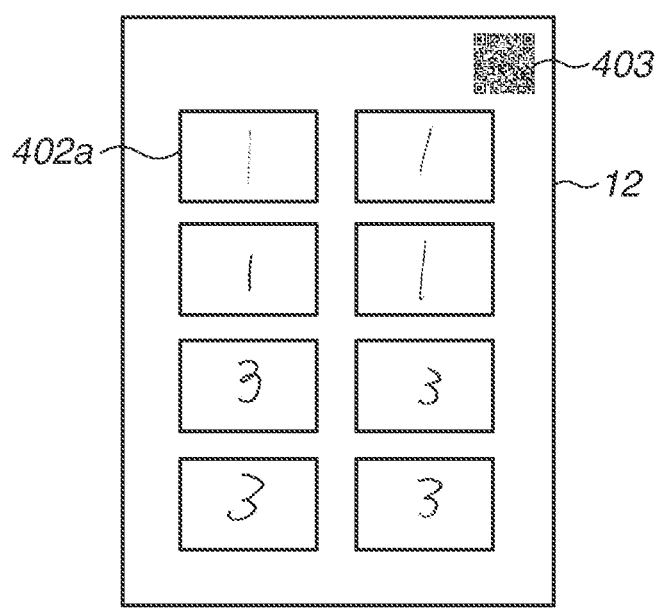
FIG.6B
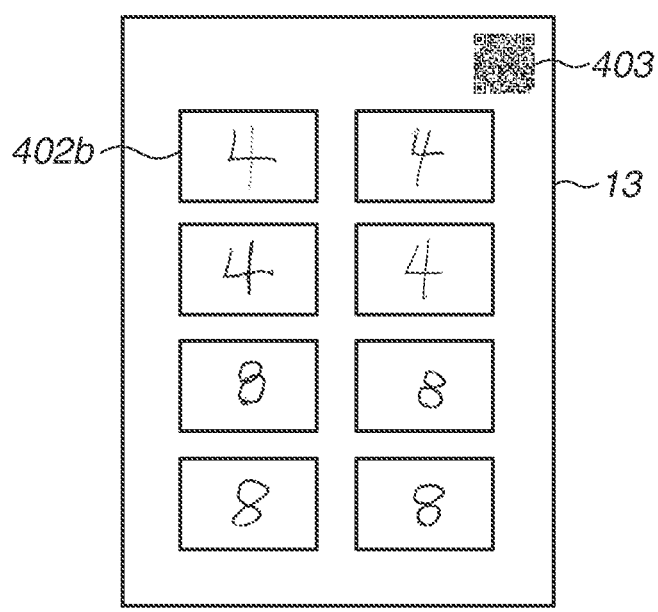
FIG.6C
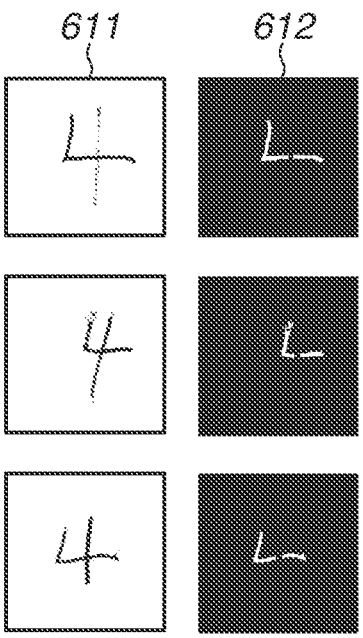
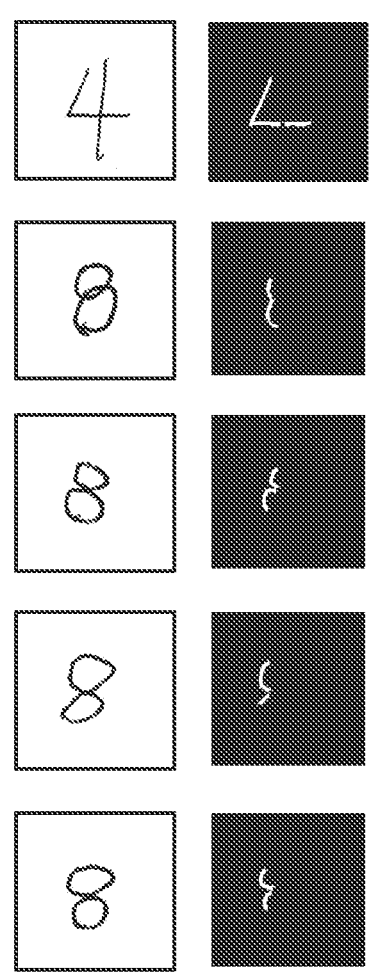

PROCESSING TARGET IMAGE (READ IMAGE)

DETECTION RESULT IMAGE (OVERALL) EMPHASIZED IMAGE

FIG.14A CHARACTER AREA IDENTICAL TO EMPHASIZED IMAGE 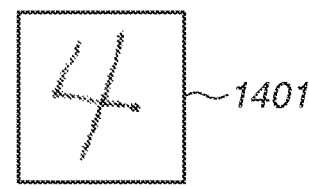
FIG.14B INCLUDING IDENTICAL CHARACTER AREA AND PERIPHERAL AREA 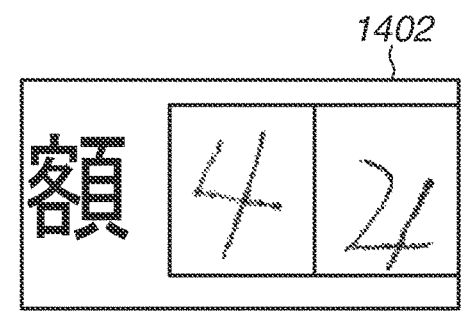
FIG.14C ARRANGING OTHER CHARACTER AREA IMAGE REPRESENTING IDENTICAL CHARACTER SIDE BY SIDE 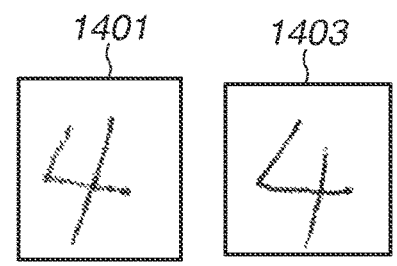
FIG.14D SUPPRESSING/ UNDISPLAYING ALTERED PORTION 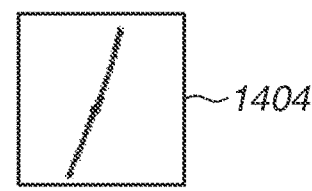

IMAGE PROCESSING SYSTEM, IMAGE PROCESSING METHOD, AND STORAGE MEDIUM

BACKGROUND

Field of the Disclosure

The present disclosure relates to an image processing system, an image processing method, and a storage medium.

Description of the Related Art

A conventional technique is known to detect an alteration in image data.

Japanese Patent Application Laid-Open No. 2009-200794 discusses an image processing apparatus for determining an alteration. The image processing apparatus divides image data into a plurality of groups each including pixels having close luminance values and performs character recognition processing for each group. If a result of performing the character recognition processing for each group and a result of performing the character recognition processing without grouping the image data are different from each other, the image processing apparatus determines that the image has been altered.

The technique discussed in Japanese Patent Application Laid-Open No. 2009-200794 determines the presence or absence of an alteration based only on the luminance. Thus, the technique may make false determination for an alteration due to luminance change of characters caused by ink blur or writing pressure, even though the characters have no alteration.

SUMMARY

The present disclosure has been devised in view of the above-described issue and is directed to reducing the possibility of false determination for a character string alteration in image data.

The image processing system according to embodiments of the present disclosure includes a generation unit configured to generate a learning model by performing machine learning processing based on an altered image, an image before an alteration, and an image representing a difference between the altered image and the image before the alteration, an input unit configured to input image data, and an estimation unit configured to estimate whether the image data input by the input unit includes an altered image, by using the learning model generated by the generation unit.

Further features of the present disclosure will become apparent from the following description of exemplary embodiments with reference to the attached drawings.

BRIEF DESCRIPTION OF THE DRAWINGS

FIG. 1 is a block diagram illustrating an example of an image processing system according to an exemplary embodiment.

FIG. 4 is a schematic view illustrating an example of a blank learning document.

FIG. 5 is a schematic view illustrating an example of a graphical user interface (GUI) for receiving an instruction for reading a document.

FIG. 6A is a schematic view illustrating an example of an original learning image. FIG. 6B is a schematic view illustrating an example of an altered learning image. FIG. 6C is a schematic view illustrating an example of learning data generated from the original learning image and the altered learning image.

FIG. 14A is an example of a comparative image in a first comparison mode. FIG. 14B is an example of a comparative image in a second comparison mode. FIG. 14C is an example of a comparative image in a third comparison mode. FIG. 14D is an example of a comparative image in a fourth comparison mode.

DESCRIPTION OF THE EMBODIMENTS

Figure 2A:
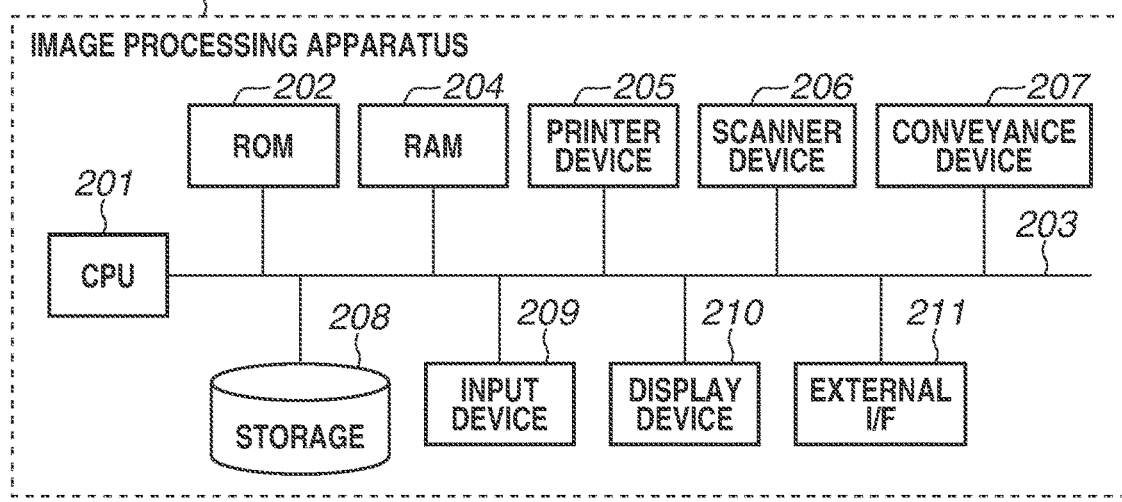
FIG. 2A is a block diagram illustrating an example of a configuration of an image processing apparatus.

Exemplary embodiments will be described in detail below with reference to the accompanying drawings. The following exemplary embodiments do not limit the present disclosure. Although a plurality of features is described in the exemplary embodiments, not all of the plurality of features is indispensable, and the plurality of features may be combined in an arbitrary way. In addition, in the accompanying drawings, identical or similar configurations are assigned the same reference numerals, and duplicated descriptions thereof will be omitted.

1. System Overview

FIG. 1 is a schematic view illustrating an example of a configuration of an image processing system 100 according to an exemplary embodiment. The image processing system 100 includes an image processing apparatus 101, a learning apparatus 102, an alteration detection server 103, and an optical character recognition (OCR) server 104. The image processing apparatus 101, the learning apparatus 102, the alteration detection server 103, and the OCR server 104 are connected with each other via a network 105.

The image processing apparatus 101 may be, for example, a Multi-Function Peripheral (MFP) having printing and image reading functions or a digital scanner dedicated for image reading. The image processing apparatus 101 includes a reading unit 111 and a display control unit 112. The reading unit 111 reads a document 11 to generate a read image. More specifically, the reading unit 111 acquires the read image of the document 11. The document 11 typically includes character strings, and thus the read image includes character images.

For example, the image processing apparatus 101 can support, in the learning stage, the generation of learning data. More specifically, an operator handwrites characters in a prepared blank learning document and sets the handwritten learning document to the image processing apparatus 101. The learning document may be, for example, a form document having write-in columns at one or more predetermined positions. The learning document may have visual identification information (e.g., a printed number, bar code, or two-dimensional code) for uniquely identifying each individual learning document. The image processing apparatus 101 may also be able to print a blank learning document. The reading unit 111 reads the set learning document to generate a read image 12. The read image 12 is handled as an image of the original of the learning document. The read image 12 is also referred to as an original learning image in the present specification. The operator or other person alters (e.g., writes strokes with a pen) the written learning document (i.e., original) and sets the altered learning document to the image processing apparatus 101. The reading unit 111 reads the altered learning document to generate a read image 13. In the present specification, the read image 13 is also referred to as an altered learning image. A plurality of pairs of the original learning image 12 and the altered learning image 13 is generated by repeating a sequence of handwriting characters in the learning document, reading the original (learning document) with the image processing apparatus 101, intentionally altering the learning document, and reading the altered learning document (an altered version) with the image processing apparatus 101. The image processing apparatus 101 transmits these pairs of the original learning image 12 and the altered learning image 13 to the learning apparatus 102 via the network 105. The learning apparatus 102 performs machine learning by using learning data generated from these pairs as described below Regardless of the above descriptions, the generation of the original learning image 12 and the altered learning image 13 may also be performed by an apparatus different from the image processing apparatus 101.

In the alteration detection stage, the image processing apparatus 101 reads the target document including handwritten characters to generate a read image 21. According to the present specification, the read image 21 is also referred to as a processing target image. The image processing apparatus 101 transmits the generated processing target image 21 to the alteration detection server 103 via the network 105. The display control unit 112 of the image processing apparatus 101 receives detection result data 32 from the alteration detection server 103. The result data 32 indicates the result of the alteration detection performed by using the processing target image 21. The display control unit 112 then controls the screen display of the alteration detection result based on the detection result data 32. Various examples of the display control will be specifically described below.

The learning apparatus 102 may be an information processing apparatus, such as a computer and workstation, performing supervised learning processing. The learning apparatus 102 includes a data processing unit 121, a learning unit 122, and a storage unit 123. The data processing unit 121 accumulates the above-described pairs of the original learning image 12 and the altered learning image 13 generated by the image processing apparatus 101 (or other apparatus) in the storage unit 123. The data processing unit 121 generates learning data based on the accumulated pairs. The learning unit 122 generates and/or updates a learned model (learning model) 41 for alteration detection through machine learning processing using the learning data generated based on the learning image (e.g., pairs of the original learning image 12 and the altered learning image 13) as a read image of the learning document. The learning unit 122 instructs the storage unit 123 to store the generated and/or updated learned model 41. For example, if a neural network model is used as a machine learning model, the learned model 41 is a data set including parameters, such as the weight and bias for each node of the neural network. Deep learning based on a multilayered neural network may be used as an example of a technique for machine learning for generating and/or updating the neural network model. Some examples of generation of learning data and generation and/or update of a learned model will be specifically described below. The learning unit 122 provides the alteration detection server 103 with the learned model 41 in response to a request from the alteration detection server 103 described below.

The alteration detection server 103 may be an information processing apparatus, such as a computer and workstation. The alteration detection server 103 detects an altered portion included in the target document by using the processing target image 21 received from the image processing apparatus 101. The alteration detection server 103 includes an image acquisition unit 131 and a detection unit 132. The image acquisition unit 131 acquires the processing target image 21, which is a read image of the target document. The detection unit 132 detects an altered portion included in the target document using the processing target image 21. According to the present exemplary embodiment, the detection unit 132 uses the above-described learned model 41 offered from the learning apparatus 102 for alteration detection. In the present exemplary embodiment, the detection unit 132 estimates whether each of a plurality of pixels in the processing target image 21 belongs to altered portions by using the learned model 41 (e.g., alteration detection for each pixel). Alternatively, a modification in which the detection unit 132 determines whether each of one or more characters in the processing target image 21 include an altered portion (e.g., alteration detection for each character)

will be described below. As a result of alteration detection, the detection unit 132 generates detection result data 32 indicating which portion of the processing target image 21 is determined to have been altered, and provides the image processing apparatus 101 with the generated detection result data 32. The detection result data 32 may include, for example, bitmap data indicating whether each pixel of the processing target image 21 belongs to the altered portion. The alteration detection result indicated by the detection result data 32 is presented to the user by the image processing apparatus 101, and the user validates the result. To support the validation by the user, the image processing apparatus 101 or the alteration detection server 103 generates an emphasized image that indicates to emphasize the pixels having being determined to belong to the altered portion the processing target image 21. In a case where the alteration detection server 103 generates the emphasized image, the alteration detection server 103 transmits the generated emphasized image, together with the above-described bitmap data, to the image processing apparatus 101.

According to the present exemplary embodiment, the processing target image 21 can be applied to the learned model 41 on a character basis. The alteration detection server 103 thus transmits the processing target image 21 to the OCR server 104 to request the OCR server 104 to recognize the characters included in the processing target image 21. The OCR server 104 may be an information processing apparatus, such as a computer and workstation. The OCR server 104 performs optical character recognition (OCR) in response to the request from the alteration detection server 103. The OCR server 104 includes a character recognition unit 141. The character recognition unit 141 performs OCR with respect to the processing target image 21 using a known technique, thereby recognizing the characters and character area positions in the processing target image 21. The character recognition unit 141 transmits the recognition result data 31 indicating the recognition result to the alteration detection server 103.

2. Apparatus Configuration

Figure 2B:
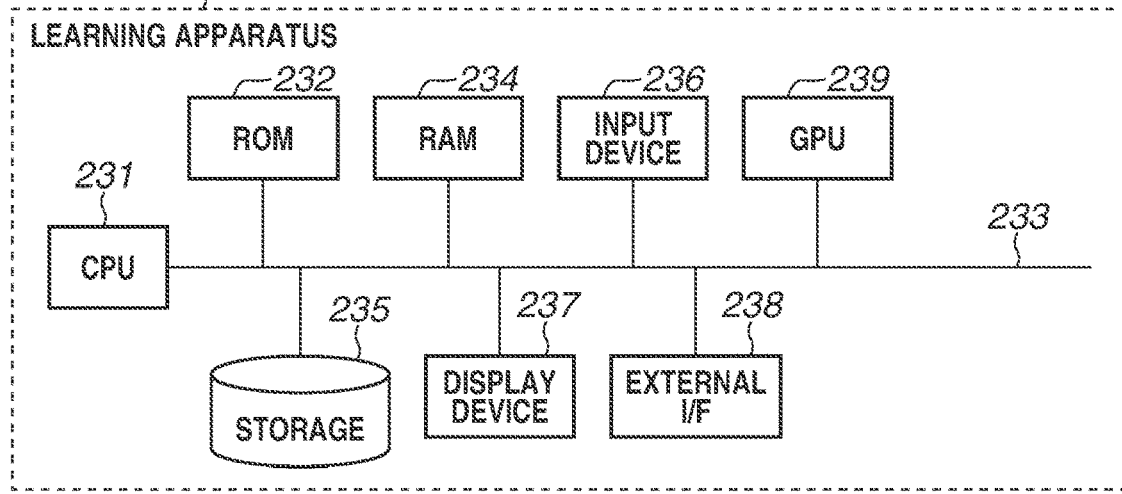
FIG. 2B is a block diagram illustrating an example of a configuration of a learning apparatus.
Figure 2C:
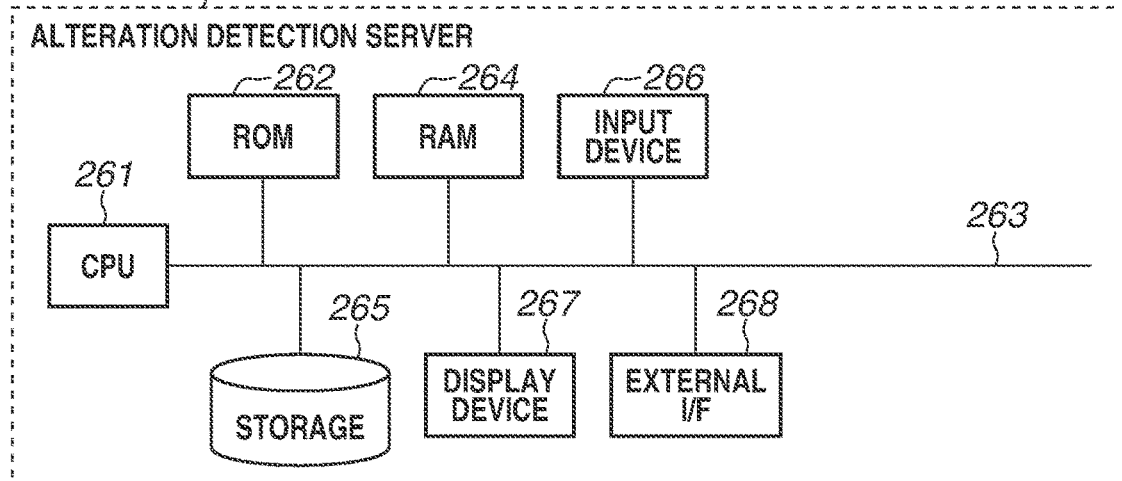
FIG. 2C is a block diagram illustrating an example of a configuration of an alteration detection server.

FIG. 2A is a block diagram illustrating an example of a configuration of the image processing apparatus 101. FIG. 2B is a block diagram illustrating an example of a configuration of the learning apparatus 102. FIG. 2C is a block diagram illustrating an example of a configuration of the alteration detection server 103.

(1) Image Processing Apparatus

The image processing apparatus 101 includes a central processing unit (CPU) 201, a read only memory (ROM) 202, a random access memory (RAM) 204, a printer device 205, a scanner device 206, a conveyance device 207, a storage 208, an input device 209, a display device 210, and an external interface (I/F) 211. A data bus 203 is a communication line for mutually connecting these devices included in the image processing apparatus 101.

The CPU 201 is configured to control the entire image processing apparatus 101. The CPU 201 executes a boot program stored in the ROM 202 a nonvolatile memory to activate the operating system (OS) of the image processing apparatus 101. The CPU 201 executes a controller program stored in the storage 208 under the OS. The controller program is a program for controlling each of the devices of the image processing apparatus 101. The RAM 204 is used as the main memory device for the CPU 201. The RAM 204 provides the CPU 201 with a temporary storage area (i.e., a work area).

The printer device 205 is configured to print an image on paper (also referred to as a recording material or sheet). The printer device 205 may employ an electrophotographic method using photosensitive drums or a photosensitive belt, the inkjet method for discharging ink from a micronozzle array to directly print an image on paper, and any other printing methods. The scanner device 206 including an optical reading device, such as a Charge Coupled Device (CCD) for optically scanning a document, converts an electrical signal supplied from an optical reading device into image data of a read image. The conveyance device 207, which may be an Automatic Document Feeder (ADF), conveys documents set on the ADF one by one to the scanner device 206. The scanner device 206 may be able to read not only a document conveyed from the conveyance device 207 but also a document placed on the document positioning plate (not illustrated) of the image processing apparatus 101.

The storage 208 may be a writable/readable auxiliary storage device including a nonvolatile memory, such as a Hard Disk Drive (HDD) and a Solid State Drive (SDD). The storage 208 stores various types of data including the above-described controller programs, setting data, and image data. The input device 209, such as a touch panel and hardware keys, receives a user input, such as an operation instruction or information input from the user. The input device 209 transmits an input signal representing the contents of the received user input to the CPU 201. The display device 210, such as a Liquid Crystal Display (LCD) or a Cathode Ray Tube (CRT), displays an image (e.g., user interface image) generated by the CPU 201 on the screen. For example, the CPU 201 may determine what operation has been performed by the user, based on the pointing position and the allocation of the user interface. The pointing position is indicated by an input signal received from the input device 209. The allocation of the user interface is displayed by the display device 210. According to the determination result, the CPU 201 controls the operation of the corresponding device or changes the contents displayed by the display device 210.

The external interface (I/F) 211 transmits and receives various types of data including image data to/from an external apparatus via the network 105. The network 105 may be, for example, a Local Area Network (LAN), a telephone line, a proximity wireless (e.g., infrared) network, or any other types of networks. The external I/F 211 can receive Page Description Language (PDL) data describing drawing contents for printing from an external apparatus, such as the learning apparatus 102 and a personal computer (PC) (not illustrated). The CPU 201 interprets the PDL data received by the external I/F 211 to generate image data. The image data can be transmitted to the printer device 205 for printing or to the storage 208 for storage. The external 211 can transmit the image data of the read image acquired by the scanner device 206 to the alteration detection server 103 for alteration detection, and receive the detection result data 32 from the alteration detection server 103.

(2) Learning Apparatus

The learning apparatus 102 includes a CPU 231, a ROM 232, a RAM 234, a storage 235, an input device 236, a display device 237, an external I/F 238, and a Graphics Processing Unit (GPU) 239. The data bus 233 is a communication line for mutually connecting these devices included in the learning apparatus 102.

The CPU 231 is configured to control the entire learning apparatus 102. The CPU 231 executes a boot program stored in the ROM 232 a nonvolatile memory to activate the OS of the learning apparatus 102. The CPU 231 executes, on this OS, a learning data generation program and a learning program stored in the storage 235. The learning data generation program is a program for generating learning data based on a pair of the original learning image 12 and the altered learning image 13. The learning program is a program for generating and/or updating a learned model (e.g., a neural network model) for alteration detection through machine learning. The RAM 234 is used as the main memory device for the CPU 231 and provides the CPU 231 with a temporary storage area (e.g., a work area).

The storage 235 may be a writable/readable auxiliary storage device including a nonvolatile memory, such as an HDD and an SDD. The storage 235 stores various types of data including the above-described programs, learning image, learning data, and model data. The input device 236, such as a mouse and a keyboard, receives a user input, such as an operation instruction and information input from the user. The display device 237, such as an LCD and a CRT, displays an image generated by the CPU 231 on the screen. The external I/F 238 transmits and receives data related to the learning processing to/from an external apparatus via the network 105. The external I/F 238 can receive, for example, a pair of the original learning image 12 and the altered learning image 13 from the image processing apparatus 101. The external I/F 238 can transmit the learned model 41 generated and/or updated through machine learning to the alteration detection server 103. The GPU 239, a processor capable of performing advanced parallel processing, promotes the learning processing for generating and/or updating the learned model 41 in collaboration with the CPU 231.

(3) Alteration Detection Server

The alteration detection server 103 includes a CPU 261, a ROM 262, a RAM 264, a storage 265, an input device 266, a display apparatus 267, and an external I/F 268. The data bus 263 is a communication line for mutually connecting these devices included in the alteration detection server 103.

The CPU 261 is a controller for controlling the entire alteration detection server 103. The CPU 261 executes a boot program stored in the ROM 262 a nonvolatile memory to activate the OS of the alteration detection server 103. The CPU 261 executes, on this OS, an alteration detection program stored in the storage 265. The alteration detection program is a program for detecting an altered portion included in the target document by using the read image (i.e., processing target image) of the target document acquired from a client apparatus (e.g., the image processing apparatus 101). The RAM 264 is used as the main memory apparatus for the CPU 261. The RAM 264 provides the CPU 261 with a temporary memory (i.e., a work area).

The storage 265 may be a writable/readable auxiliary storage device including a nonvolatile memory, such as an HDD and an SDD. The storage 265 stores various types of data, such as the above-described programs, image data, and the detection result data 32. The input device 266, such as a mouse and a keyboard, receives a user input, such as an operation instruction and information input from the user. The display apparatus 267, such as an LCD and a CRT, displays an image generated by the CPU 261 on the screen. The external I/F 268 transmits and receives data related to alteration detection to/from an external apparatus via the network 105. The external I/F 268 can, for example, receive the processing target image 21 from the image processing apparatus 101 and transmit the detection result data 32 to the image processing apparatus 101. The external I/F 268 can transmit a request for offering the learned model 41 to the learning apparatus 102 and receive the learned model 41 from the learning apparatus 102. The external I/F 268 can transmit a request for performing the OCR to the OCR server 104 and receive the recognition result data 31 indicating the OCR result from the OCR server 104.

Although not illustrated in FIG. 2C, the configuration of the OCR server 104 may also be similar to the configuration of the alteration detection server 103.

3. Processing Flow

Figure 3A:
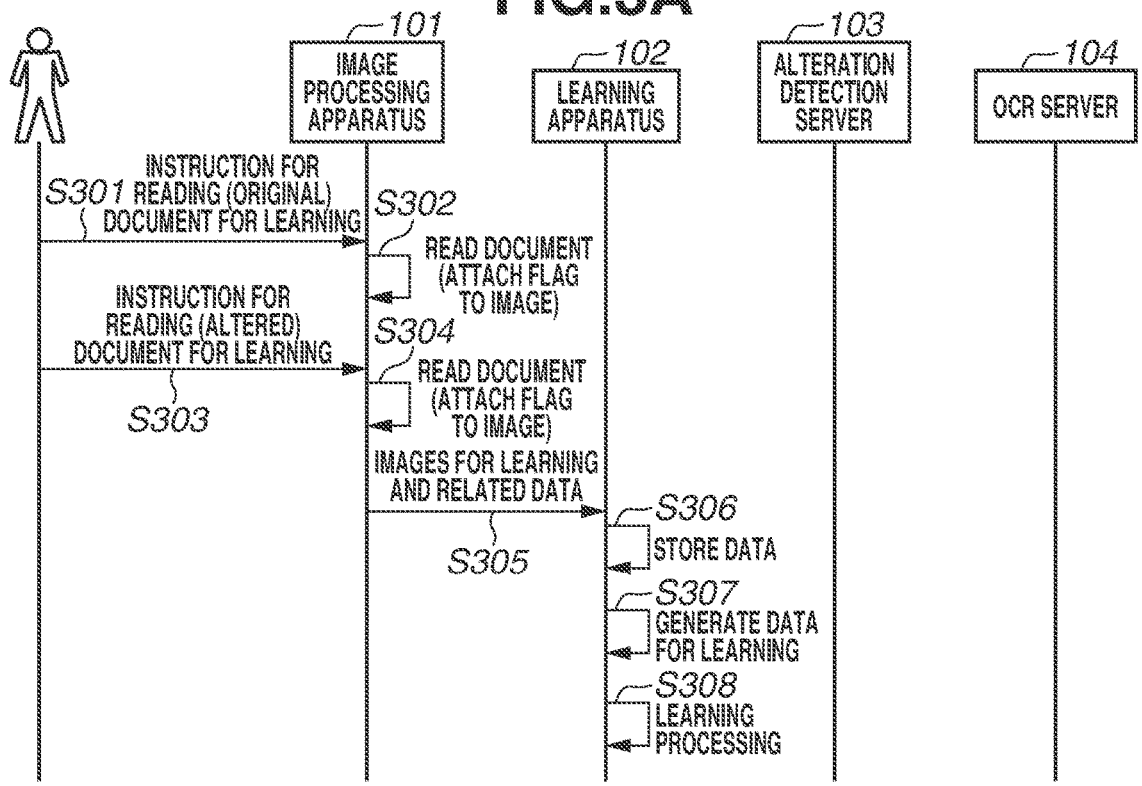
FIG. 3A is a sequence diagram illustrating an example of an overall processing flow performed by the image processing system in a learning stage according to an exemplary embodiment.
Figure 3B:
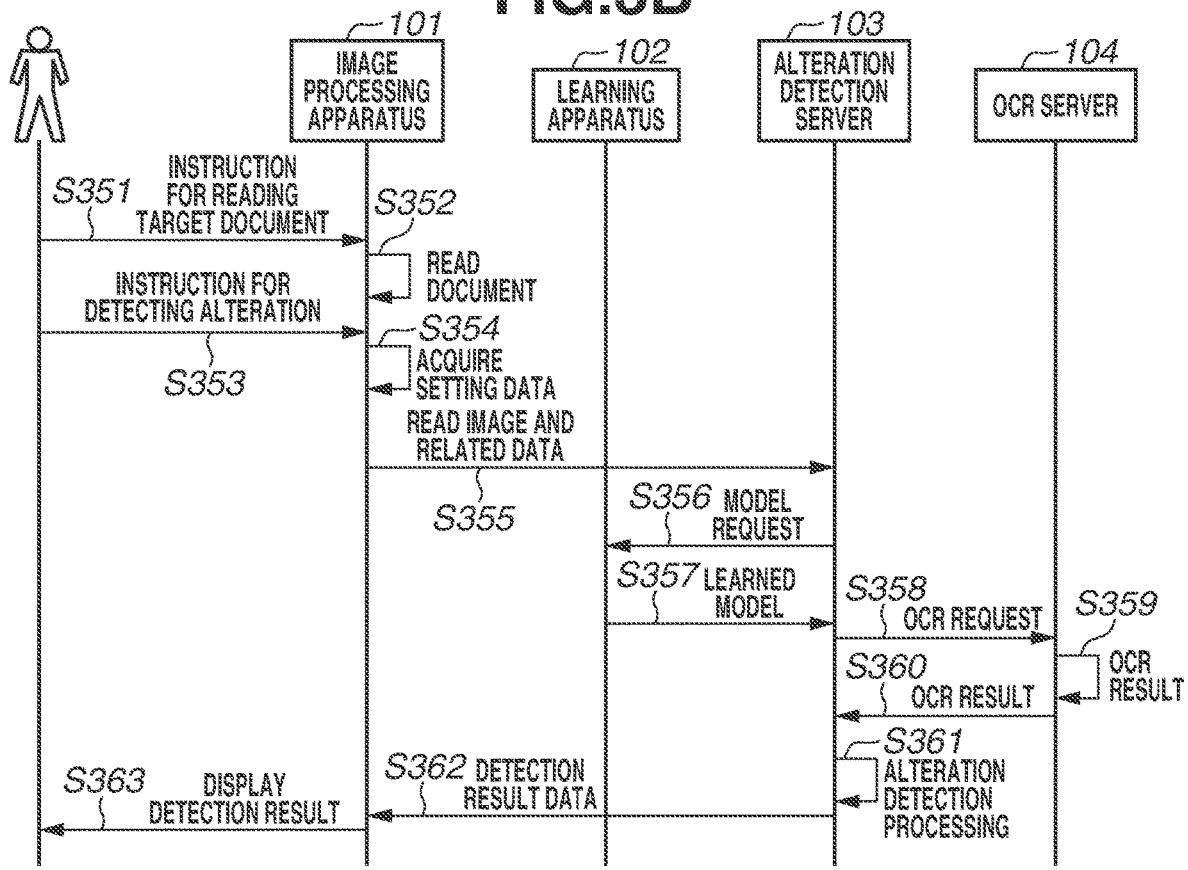
FIG. 3B is a sequence diagram illustrating an example of an overall processing flow performed by the image processing system in an alteration detection stage according to an exemplary embodiment.

FIG. 3A is a sequence diagram illustrating an example of a schematic processing flow in the learning stage performed by the image processing system 100. FIG. 3B is a sequence diagram illustrating an example of a schematic processing flow in the alteration detection stage performed by the image processing system 100.

<3-1. Learning Stage>

In step S301, the operator sets, in the learning stage, a learning document filled with handwritten characters on the image processing apparatus 101 and instructs the image processing apparatus 101 to read the document. In this case, the operator inputs information indicating that the set learning document is the original, which is not altered, to the image processing apparatus 101 via the input device 209. In step S302, according to the operator's instruction, the reading unit 111 of the image processing apparatus 101 reads the set learning document to generate the read image 12. The reading unit 111 attaches a flag indicating that the read image 12 is the original learning image to the read image 12. In step S303, the operator sets the altered learning document to the image processing apparatus 101 and instructs the image processing apparatus 101 to read the document. In this case, the operator inputs information indicating that the set learning document includes the altered portion to the image processing apparatus 101 via the input device 209. In step S304, according to the operator's instruction, the reading unit 111 of the image processing apparatus 101 reads the set learning document to generate the read image 13. The reading unit 111 attaches a flag indicating that the read image 13 is an altered learning image, to the read image 13. In steps S302 and S304, the reading unit 111 reads identification information included in the learning document to recognize that the original learning image 12 and the altered learning image 13 are a pair of the original and an altered versions of the same learning document. The reading unit 111 associates a document identifier (ID) for identifying the recognized learning document with the original learning image 12 and the altered learning image 13. The reading unit 111 further associates a data set ID for identifying the unit of the learned model generation/update with the original learning image 12 and the altered learning image 13. As an example, when generating and/or updating one learned model for each image processing system, the data set ID may be an identifier for uniquely identifying the image processing apparatus 101. As another example, when generating and/or updating one learned model for each user, the data set ID may be an identifier for uniquely identifying each user. As yet another example, when generating and/or updating one learned model for each user group, the data set ID may be an identifier for uniquely identifying each user group. In step S305, the reading unit 111 transmits these learning images and related data (e.g., the original learning image 12, the altered learning image 13, the flag, the document ID, and the data set ID) generated in this way, to the learning apparatus 102.

FIG. 4 is a schematic view illustrating an example of a blank learning document. In the example illustrated in FIG.

4, a learning document 401 is a form-format document including eight character write-in columns 402. The operator enters an arbitrary character in each character write-in column 402 to generate the original of the learning document. The learning document 401 has identification information 403 located at the top right corner. The identification information (also referred to as embedded information) 403 is a visually expressed two-dimensional code of the document ID for uniquely identifying the learning document 401. The positions and sizes of character write-in columns included in the learning document identified by the document ID are predefined and shared with the learning apparatus 102. The document ID may be, for example, a Universally Unique Identifier (UUID).

FIG. 5 is a schematic view illustrating an example of a graphical user interface (GUI) used by the image processing apparatus 101 to receive an instruction for reading a document. An operation window 500 illustrated in FIG. 5 can be displayed, for example, on the screen of the display device 210. The operation window 500 includes a preview area 501, type selection buttons 502 and 503, a Scan button 505, and a Start Transmission button 506. The type selection buttons 502 and 503 enable the operator to specify whether the type (also referred to as an attribute) of the document to be read or the read document is an original or altered version. When the user operates (e.g., taps) the type selection button 502, the reading unit 111 attaches the flag indicating that the read image is an altered learning image, to the read image. In contrast, when the user operates the type selection button 503, the reading unit 111 attaches the flag indicating that the read image is the original learning image, to the read image. In the operation window 500, the buttons corresponding to the specified type (the original or an altered version) may be displayed on an emphasized way. The Scan button 505 is used to trigger reading of the document set on the image processing apparatus 101. When the user operates the Scan button 505 and scanning is completed, a preview image of the read image is displayed in the preview area 501. Before starting data transmission, the operator may set another document on the image processing apparatus 101 and operate the Scan button 505 again to collectively store a plurality of read images and related data in the image processing apparatus 101. When scanning of at least one learning document is completed and then the document type is specified, the Start Transmission button 506 becomes operable. The Start Transmission button 506 is used to trigger transmission of the read image and related data. When the user operates the Start Transmission button 506, the reading unit 111 transmits the learning image and related data to the learning apparatus 102 (refer to step S305 illustrated in FIG. 3A).

In step S305 illustrated in FIG. 3A, the data processing unit 121 of the learning apparatus 102 receives the learning image and related data from the image processing apparatus 101. In step S306, the data processing unit 121 instructs the storage unit 123 to store the received learning image and related data. When a sufficient amount of data has been accumulated for learning, the data processing unit 121 and the learning unit 122 start processing for machine learning. In step S307, the data processing unit 121 reads a pair of the original learning image 12 and the altered learning image 13 from the storage unit 123 to generate learning data from these read images.

FIGS. 6A, 6B and 6C illustrate how the learning data is generated based on the learning image. FIGS. 6A and 6B illustrate an example of the original learning image 12 and an example of the altered learning image 13, respectively. As described above, the original learning image 12 and the altered learning image 13 forming a pair include common character write-in columns. In the example illustrated in FIG. 6A, the digit "1" is input to a character write-in column 402a of the original learning image 12. In contrast, the contents of a character write-in column 402b of the altered learning image 13 has been altered. Since strokes has been added, the character in the character write-in column 402b looks like a digit "4". The data processing unit 121 clips partial images of the character write-in columns from the original learning image 12 and the altered learning image 13, and calculates a difference image between partial images clipped from common character write-in columns. The data processing unit 121 can acquire positions of the character write-in columns to be clipped based on the document ID acquired by reading the identification information 403. In the difference image, a pixel indicating zero or an absolute value equal to or less than a predetermined threshold value is assumed not to belong to the altered portion, and a pixel indicating an absolute value larger than the threshold value is assumed to belong to the altered portion. A character area image 611 illustrated in FIG. 6C is a partial image clipped from the character write-in column 402b of the altered learning image 13. The character area image 611 serves as an input learning image to be input to the machine learning model by the learning unit 122. The binary image 612 illustrated in FIG. 6C is an image generated and/or updated by the following procedures: clipping a partial image from the character write-in column 402a of the original learning image 12, subtracting the partial image (after being positioned as required) from the character area image 611, and binarizing the resultant image based on the above-described threshold value. In the binary image 612, pixels indicating truth (e.g., white pixels) belong to the altered portion, and pixels indicating false (e.g., black pixels) do not belong to the altered portion. The binary image 612 serves as a teacher image to be handled as teacher data for machine learning performed by the learning unit 122.

The learning image may include the original learning image 12 without the altered learning image 13 corresponding thereto. In this case, the data processing unit 121 can generate a partial image clipped from the character write-in column 402a of the original learning image 12 as an input learning image, and generate a binary image in which all pixels indicate false with the same size (i.e., indicating that the entire image includes no altered portion) as a teacher image.

The data processing unit 121 generates a plurality of the above-described input images and corresponding teacher images based on the plurality of pairs of the original learning image 12 and the altered learning image 13 related with the same data set ID. In step S308, the learning unit 122 repetitively performs the learning processing using these input images and teacher images within the range of the same data set ID, thereby generating and/or updating the learned model 41 for alteration detection. The learned model 41 is not limited to a certain model but may be a fully convolutional network (FCN) model. For example, one repetition of the learning processing can include the following procedures: inputting an input image to the model, calculating an error for teacher data of output data calculated based on the model (having temporary parameter values), and adjusting the parameter values for reducing the error. For example, the cross entropy can be used as an index of the error. For example, the back-propagation method can be used as a technique for adjusting the parameter values. The learning unit 122 can repeat the learning processing until the convergence of learning is determined or until the number of repetitions reaches an upper limit. Then, the learning unit 122 stores the generated and/or updated learned model 41 (a set of model parameters configuring the learned model 41) in the storage unit 123 in association with the corresponding data set ID. The learning unit 122 may generate and/or update different learned models 41 for two or more different data set IDs. The learning unit 122 may update the previously generated and; or updated learned model 41 through additional learning processing using a newly acquired learning image. The learning unit 122 may also select the learning data to be input to the learning processing through either one of the on-line learning method, the batch learning method, and the mini-batch learning method.

<3-2. Alternation Detection Stage>

(1) Schematic Processing Flow

In the alteration detection stage, in step S351, the user sets the target document to the image processing apparatus 101 and instructs the image processing apparatus 101 to read the document. The user may be identical to or different from the operator involved in the learning stage. In step S352, the reading unit 111 of the image processing apparatus 101 reads the set target document to generate the read image 21 according to a user instruction. In step S353, the user instructs the image processing apparatus 101 to detect an alteration for the target document. In step S354, the reading unit 111 attaches a flag indicating that the read image 21 is the processing target image, to the read image 21, and acquires setting data related to the alteration detection (e.g., from a memory), according to an instruction for detecting an alteration. The acquired setting data can include, for example, the data set ID (e.g., an identifier for identifying the image processing apparatus 101 and the user or user group) for identifying the learned model to be used for the alteration detection. In step S355, the reading unit 111 transmits the processing target image 21 and related data, together with the alteration detection request, to the alteration detection server 103.

In step S355, the image acquisition unit 131 of the alteration detection server 103 receives the processing target image 21 as the read image of the target document and related data, together with the alteration detection request, from the image processing apparatus 101. The image acquisition unit 131 outputs the received image and data to the detection unit 132. In step S356, the detection unit 132 requests the learning apparatus 102 to oiler the latest learned model 41. The model request to be transmitted to the learning apparatus 102 can include the data set ID. Upon reception of the model request, then in step S357, the learning unit 122 of the learning apparatus 102 reads the latest learned model 41 from the storage unit 123 and transmits the read learned model 41 to the detection unit 132. The latest learned model 41 is identified, for example, by the data set ID. In step S358, the detection unit 132 transmits the processing target image 21 to the OCR server 104 to request the OCR server 104 to recognize characters included in the processing target image 21. Upon reception of the OCR request, then in step S359, the character recognition unit 141 of the OCR server 104 subjects the processing target image 21 to the OCR to recognize the characters and character area positions in the processing target image 21. In step S360, the character recognition unit 141 transmits the recognition result data 31 indicating the recognition result to the detection unit 132. In step S361, the detection unit 132 applies the processing target image 21 to the learned model 41 offered from the learning apparatus 102, thereby detecting an altered portion included in the target document. As described above, the learned model 41 is a model generated and/or updated through machine learning using the learning image as a read image of the learning document. In the alteration detection processing, for example, the detection unit 132 applies the partial image of the processing target image 21 to the processing target image 21 for each character area recognized as a result of the OCR The alteration detection result as a bitmap data indicating whether each pixel belongs to the altered portion is thereby generated for the character area for each character recognized in the processing target image 21. In step S362, the detection unit 132 transmits the detection result data 32 to the image processing apparatus 101. The detection result data 32 includes integrated bitmap data having the same size as the processing target image 21, which indicates whether each pixel belongs to the altered portion, generated by integrating the bitmap data obtained for each character area. In the following descriptions, this integrated bitmap data is referred to as a detection result image. The detection unit 132 may additionally generate an emphasized image that emphasizes the pixels (hereinafter referred to as altered pixels) determined to belong to the altered portion as a result of the alteration detection by the processing target image 21, and include the generated emphasized image in the detection result data 32.

Figure 7A:
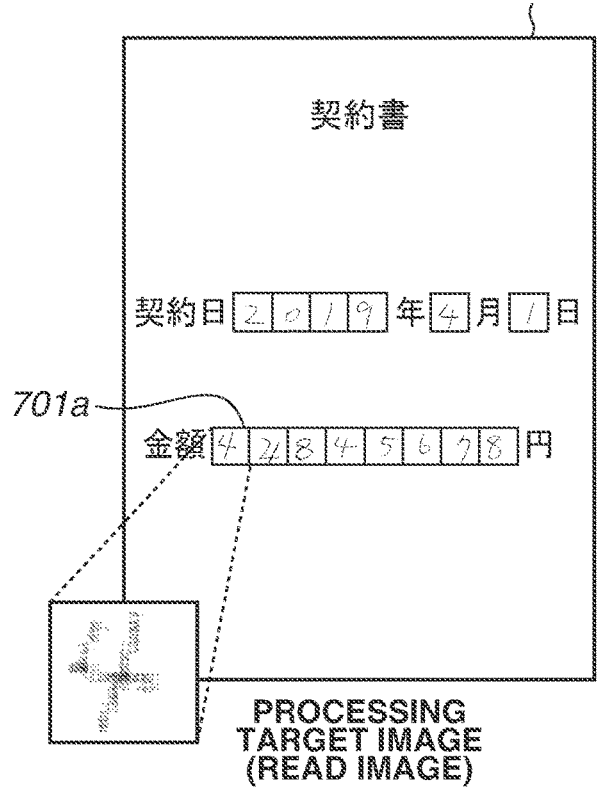
FIG. 7A is a schematic view illustrating an example of a processing target image.
Figure 7B:
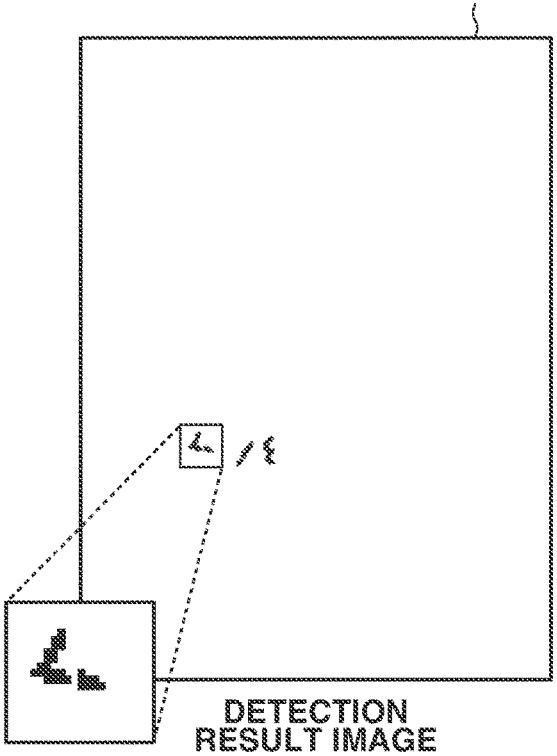
FIG. 7B is a schematic view illustrating an example of a bitmap as an alteration detection result.
Figure 7C:
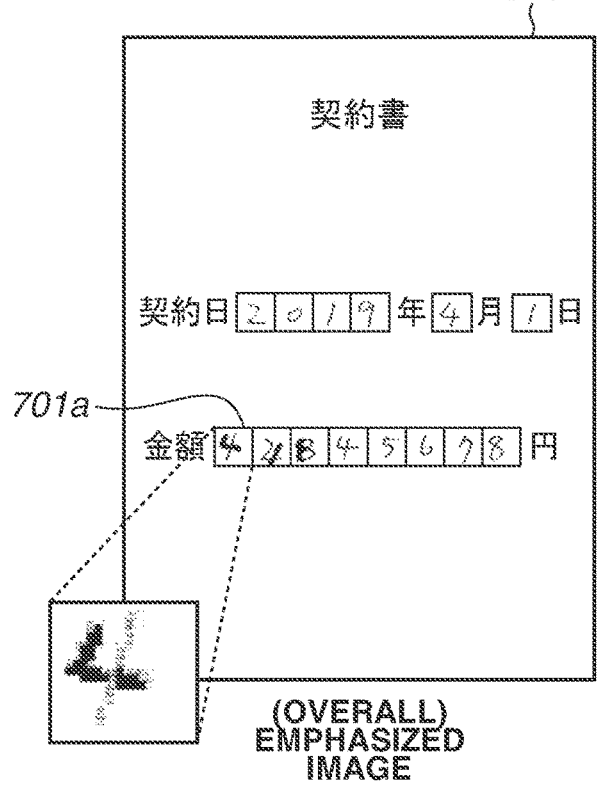
FIG. 7C is a schematic view illustrating an example of an emphasized image having an emphasized altered portion.

FIG. 7A illustrates a processing target image 21*a* as an example. FIG. 7B illustrates a detection result image 32*a* indicating the alteration detection result for the processing target image 21*a*, FIG. 7C illustrates an emphasized image 32*h* that emphasizes the altered portion of the processing target image 21*a*. The processing target image 21*a* is an image generated by reading a contract document as the target document. The processing target image 21*a* includes a plurality of character areas. The character in a character area 701*a* looks like a digit "4". These character areas can be recognized as a result of the OCR performed by the character recognition unit 141 of the OCR server 104. The detection unit 132 of the alteration detection server 103 clips a character area image in each character area from the processing target image 21 and applies the learned model 41 to each character area image. This enables the detection unit 132 to determine whether each pixel in each character area belongs to the altered portion. The detection result image 32*a* is a binary image that integrates the alteration detection results as the entire image. In the detection result image 32*a*, pixels determined to belong to the altered portion indicate truth (e.g., black pixels), and pixels determined not to belong to the altered portion indicate false (e.g., white pixels). For example, the pixels forming some strokes of the digit "4" in the character area 701*a* indicate truth. This means the possibility that strokes have been added afterward for alteration. The emphasized image 32*b* is an image generated in the processing target image 21*a* by changing the color of the pixels indicating truth in the detection result image 32*a* to a particular color. The particular color in this case is not limited but may be, for example, red (RGB=[255, 0, 0]). In the example illustrated in FIG. 7C, the color of some strokes of the digit "4" are changed in the character area 701*a* in the emphasized image 32*b*. The technique for emphasizing the pixels determined to belong to the altered portion is not limited to the above-described technique for changing the color. The technique may take any method, such as thickening or blinking lines.

In step S362 illustrated in FIG. 3B, the display control unit 112 of the image processing apparatus 101 receives the above-described detection result data 32 from the alteration detection server 103. In step S363, the display control unit 112 displays the alteration detection result on the screen based on the detection result data 32. In the present exemplary embodiment, when the detection result data 32 indicates that the altered portion was detected in the target document, the display control unit 112 contrastively displays the emphasized image of the area including the altered portion and the comparative image on the screen. In this case, the emphasized image is an image emphasizing the altered portion in the processing target image 21, and the comparative image is an image representing the altered portion as it is in the processing target image 21. This enables the user to grasp which portion of the image is suspected for alteration based on the emphasized image, and determine whether the image has been altered through monitoring tint or shading of the relevant portion in the comparative image. Examples of such contrastive display and some variations of comparative images will be described below.

(2) Specific Processing Flow of Alternation Detection Stage (Image Processing Apparatus)

Figure 8:
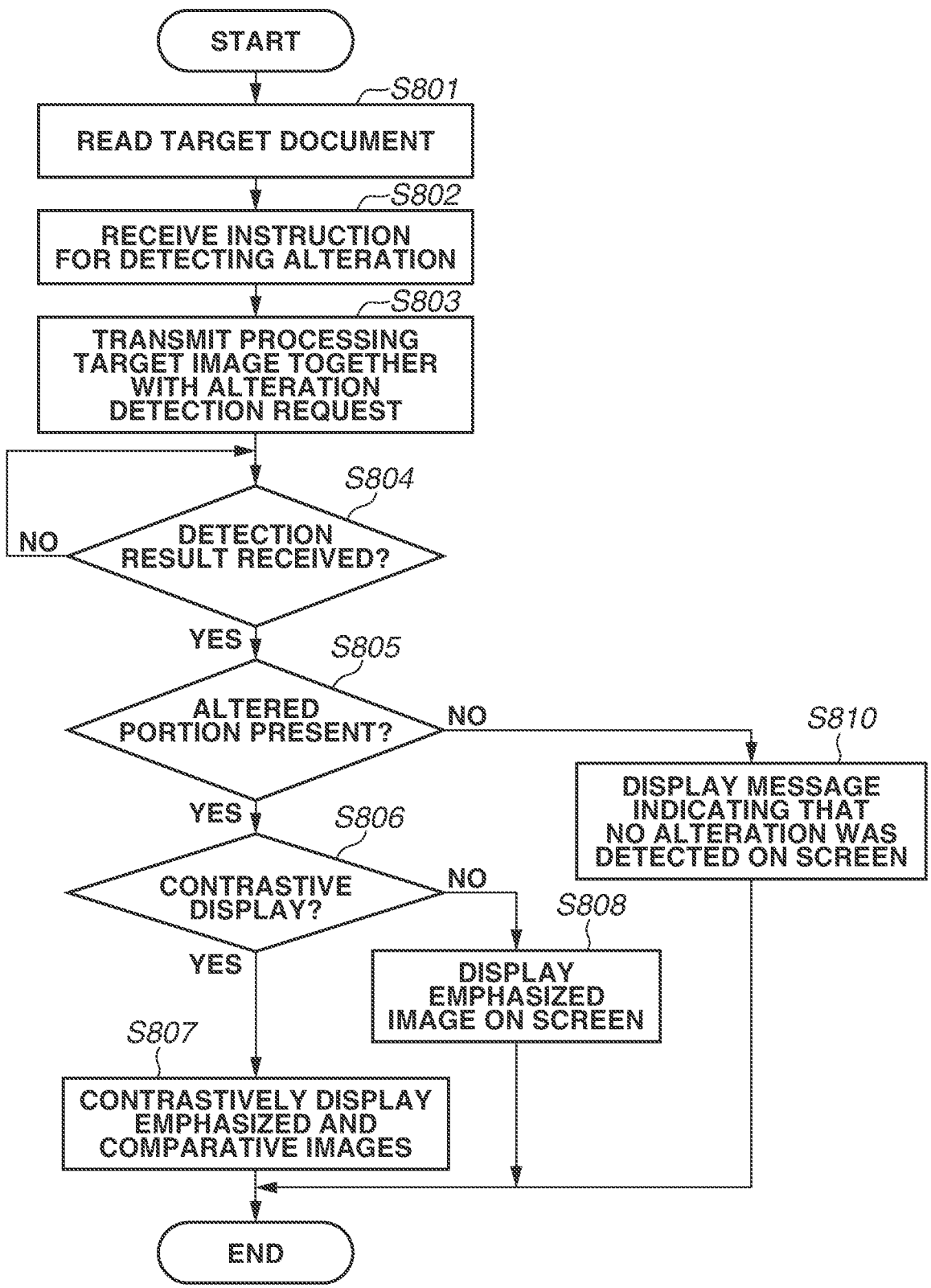
FIG. 8 is a flowchart illustrating an example of a specific processing flow performed by the image processing apparatus in the alteration detection stage.

FIG. 8 is a flowchart illustrating an example of a specific processing flow performed by the image processing apparatus 101 in the alteration detection stage. The processing illustrated in FIG. 8 is performed by the image processing apparatus 101 under control of the CPU 201 that executes the controller program loaded from the storage 208 into the RAM 204. This processing can be started upon detection of a predetermined operation of the user via the input device 209 of the image processing apparatus 101.

In step S801, the reading unit 111 reads a target document set on the conveyance device 207 by using the scanner device 206 to generate a processing target image. The processing target image may be, for example, a full color (3 channels of RGB) image. In step S802, the reading unit 111 receives via the input device 209 an instruction for detecting an alteration input by the user. In step S803, the reading unit 111 transmits the processing target image and related data (e.g., the data set ID), together with the alteration detection request, to the alteration detection server 103 via the external I/F 211. In step S804, the display control unit 112 waits for reception of the detection result data 32 from the alteration detection server 103. Upon reception of the detection result data 32 from the alteration detection server 103 via the external I/F 211 (YES in step S804), the processing proceeds to step S805. In step S805, the display control unit 112 determines whether the detection result data 32 indicates that the target document includes the altered portion. When the display control unit 112 determines that the target document includes the altered portion (YES in step S805), the processing proceeds to step S806. In contrast, when the display control unit 112 determines that the target document does not include the altered portion (NO in step S805), the processing proceeds to step S810. In step S806, the display control unit 112 determines, based on a user input, whether to contrastively display the emphasized and the comparative images or display only the emphasized image as an alteration detection result. If determined to contrastively display the emphasized and the comparative images (YES in step S806), the processing proceeds to step S807. If determined to display only the emphasized image (NO in step S806), the processing proceeds to step S808. In step S807, the display control unit 112 contrastively displays the emphasized image that emphasizes the altered portion in the processing target image and the comparative image that represents the altered portion as it is in the processing target image, on the screen of the display device 210. Examples of contrastive display will be further described below with reference to FIGS. 13A, 13B, and 15. In step S808, the display control unit 112 displays the emphasized image that emphasizes the altered portion in the processing target image on the screen of the display device 210. Examples of display will be further described below with reference to FIGS. 11B and 12. In step S810, the display control unit 112 displays information indicating that no alteration has been detected in the processing target image on the screen of the display device 210. In addition to the display of such an alteration detection result, the image processing apparatus 101 may store the processing target image and the emphasized and the comparative images as image data in the storage 208. Alternatively, the image processing apparatus 101 may transmit these images to other apparatus via, the external I/F 211. Alternatively, one or more of these images may be printed with the printer device 205.

(3) Specific Processing Flow in Alternation Detection Stage (Alternation Detection Server)

Figure 9:
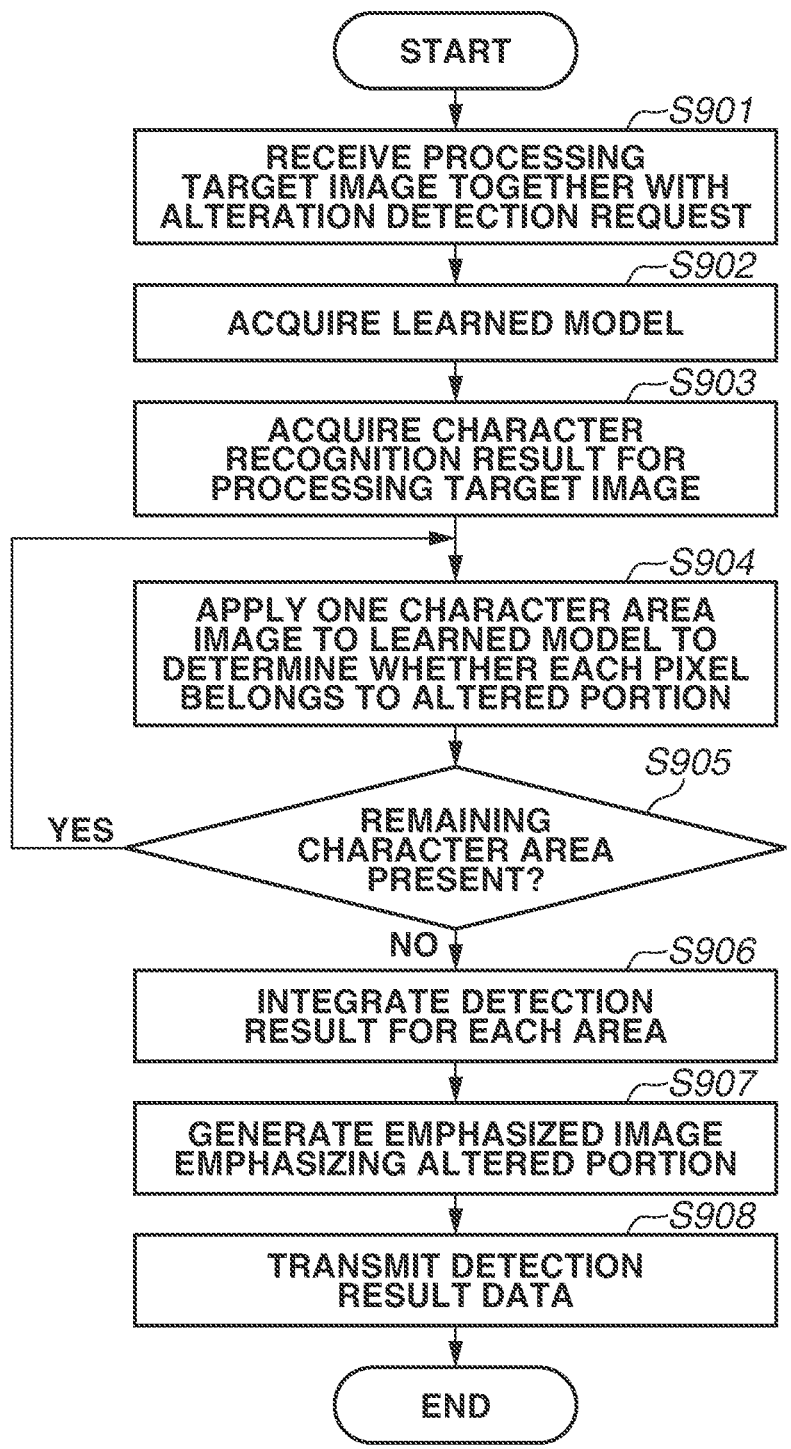
FIG. 9 is a flowchart illustrating an example of a specific processing flow performed by the alteration detection server in the alteration detection stage.

FIG. 9 is a flowchart illustrating an example of a specific processing flow performed by the alteration detection server 103 in the alteration detection stage. The processing illustrated in FIG. 9 is performed by the alteration detection server 103 under the control of the CPU 261 that executes the controller program loaded from the storage 265 into the RAM 264. This processing can be started upon reception of an alteration detection request from the image processing apparatus 101 via the external I/F 268. A process of waiting for the alteration detection request can be started when power of the alteration detection server 103 is turned ON.

In step S901, the image acquisition unit 131 receives the processing target image and related data (e.g., the data set ID), together with the alteration detection request, from the image processing apparatus 101 via the external I/F 268. In step S902, the detection unit 132 transmits a request for offering a learned model to the learning apparatus 102 via the external I/F 268 and acquires the learned model from the learning apparatus 102. The detection unit 132 acquires the learned model identified by the data set ID received, for example, together with the alteration detection request. The detection unit 132 builds a neural network model, for example, on the RAM 264 and reflects values of the model parameters received from the learning apparatus 102 to the built model. In step S903, the detection unit 132 transmits a request for performing OCR for the processing target image, together with the processing target image, to the OCR server 104 via the external I/F 268 and receives recognition result data representing the OCR result from the OCR server 104. In step S904, the detection unit 132 clips one character area image out of characters recognized in the processing target image from the processing target image and applies the clipped character area image to the learned model acquired in step S902. The detection unit 132 thereby determines whether each of the plurality of pixels in the character area image belongs to the altered portion. The character area image may be subjected to the gray-scaling before being applied to the learned model. The result of the determination is bitmap data similar to the binary image 612 illustrated in FIG. 6C. In step S905, the detection unit 132 determines whether there remains any unprocessed character area in the processing target image. If there remains an unprocessed character area therein (YES in step S905), the processing returns to step S904, in step S904, the detection unit 132 repeats the determination in step S904 for the next character area. In contrast, if there remains no unprocessed character area in the processing target image (NO in step S905), the processing proceeds to step S906. In step S906, the detection unit 132 integrates the detection results acquired for respective character areas as a result of the repetition in step S904 into one piece of bitmap data, and thereby generating a detection result image. In step S907, the detection unit 132 generates an emphasized image that emphasizes the altered portion in the processing target image. In step S908, the detection unit 132 transmits the detection result data 32 including the detection result image and the emphasized images to the image processing apparatus 101 via the external I/F 268.

In the above-described example, the detection unit 132 clips a character area image from the processing target image based on the OCR result. However, the OCR does not necessarily need to be used. For example, if the target document is a form having a known format, the detection unit 132 can clip the image in the partial area square area) at a predetermined position from the processing target image as a character area image, according to a known format.

4. Details of Display Control

Figure 10:
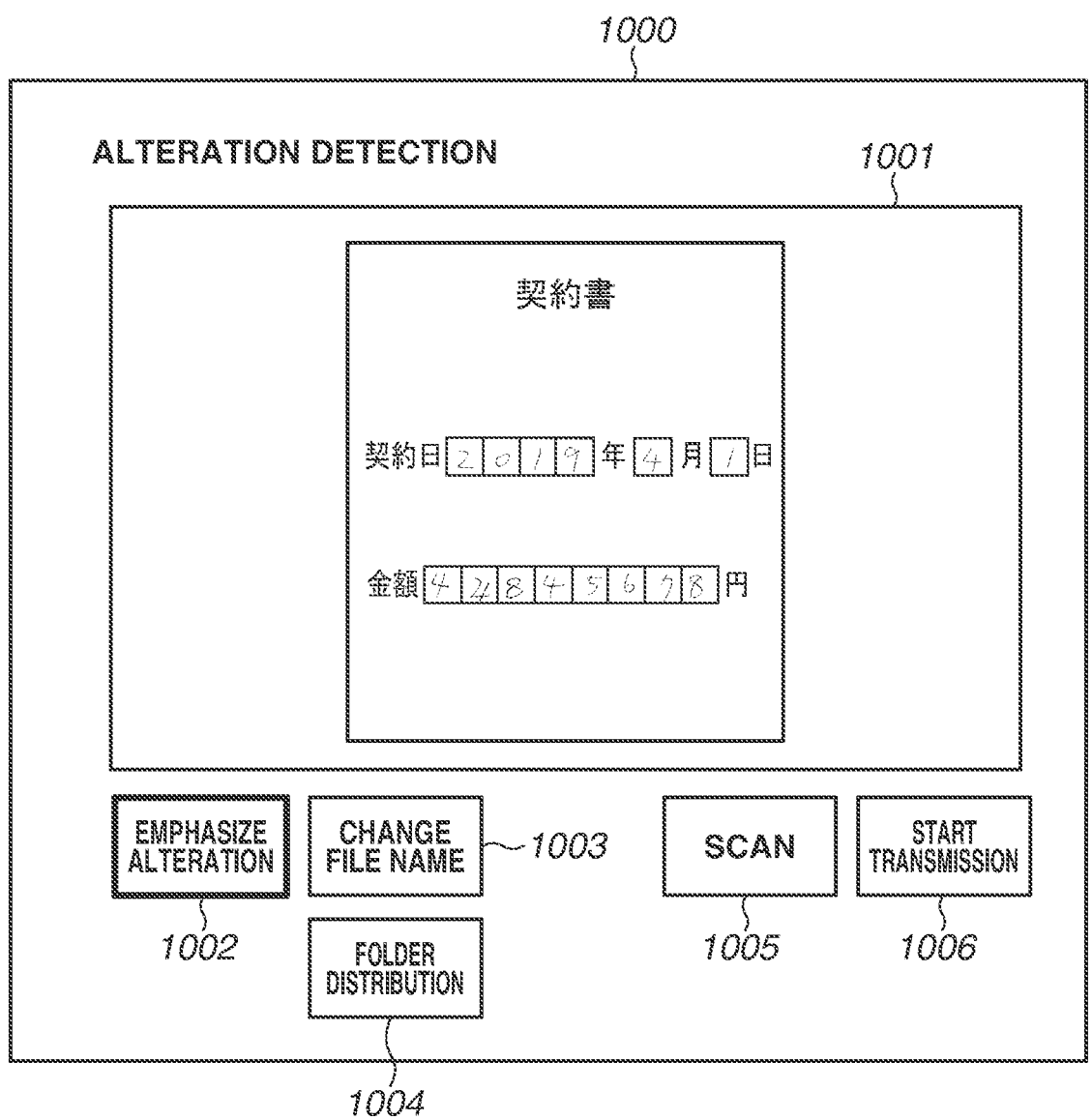
FIG. 10 is a schematic view illustrating an example of a GUI for setting and specifying alteration detection.

FIG. 10 is a schematic view illustrating an example of a GUI for setting and specifying the alteration detection. This GUI can be displayed on the screen of the display device 210 under control of the display control unit 112 of the image processing apparatus 101. A setting window 1000 illustrated in FIG. 10 includes a preview area 1001, an Emphasize Alteration button 1002, a Change File Name button 1003, a Folder Distribution button 1004, a Scan button 1005, and a Start Transmission button 1006. The Emphasize Alteration button 1002 is used to set whether to enable the emphasis of the altered portion when displaying the alteration detection result. The Change File Name button 1003 is used to set whether to enable the automatic change of the file name of the read image data based on the alteration detection result. The Folder Distribution button 1004 is used to whether to enable the automatic folder distribution for the read image data based on the alteration detection result. In the setting window 1000, the buttons corresponding to the enabled settings may be displayed in an emphasized way. The Scan button 1005 is used to trigger the reading of the document set on the image processing apparatus 101. When the user operates the Scan button 1005 and scanning is completed, a preview image of the read image is displayed in the preview area 1001. Before data transmission is started, the user may set another document on the image processing apparatus 101 and operate the Scan button 1005 again to instruct the image processing apparatus 101 to collectively store a plurality of read images and related data in the image processing apparatus 101. When scanning of at least one target document is completed, the Start Transmission button 1006 becomes operable. The Start Transmission button 1006 is used to input an instruction for detecting an alteration for triggering the transmission of the processing target image and related data. When the user operates the Start Transmission button 1006, the reading unit 111 transmits the processing target image and related data, together with the alteration detection request, to the alteration detection server 103.

Figure 11A:
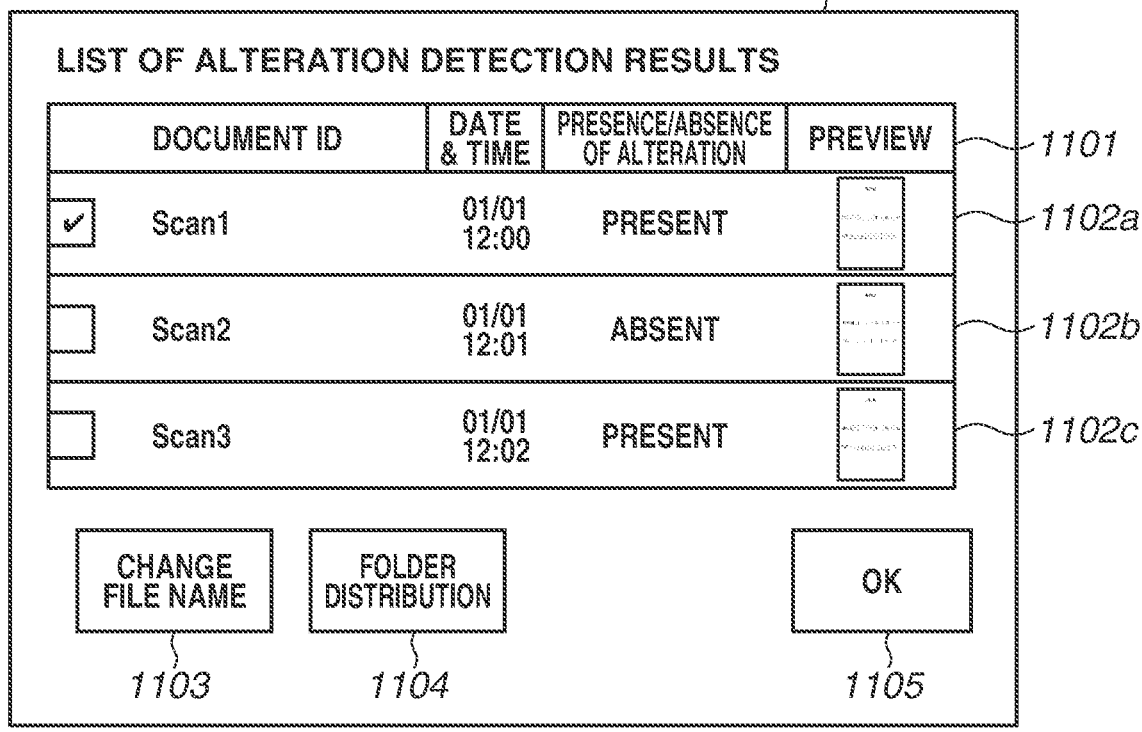
FIG. 11A is a schematic view illustrating an example of a GUI for displaying a list of alteration detection results.
Figure 11B:
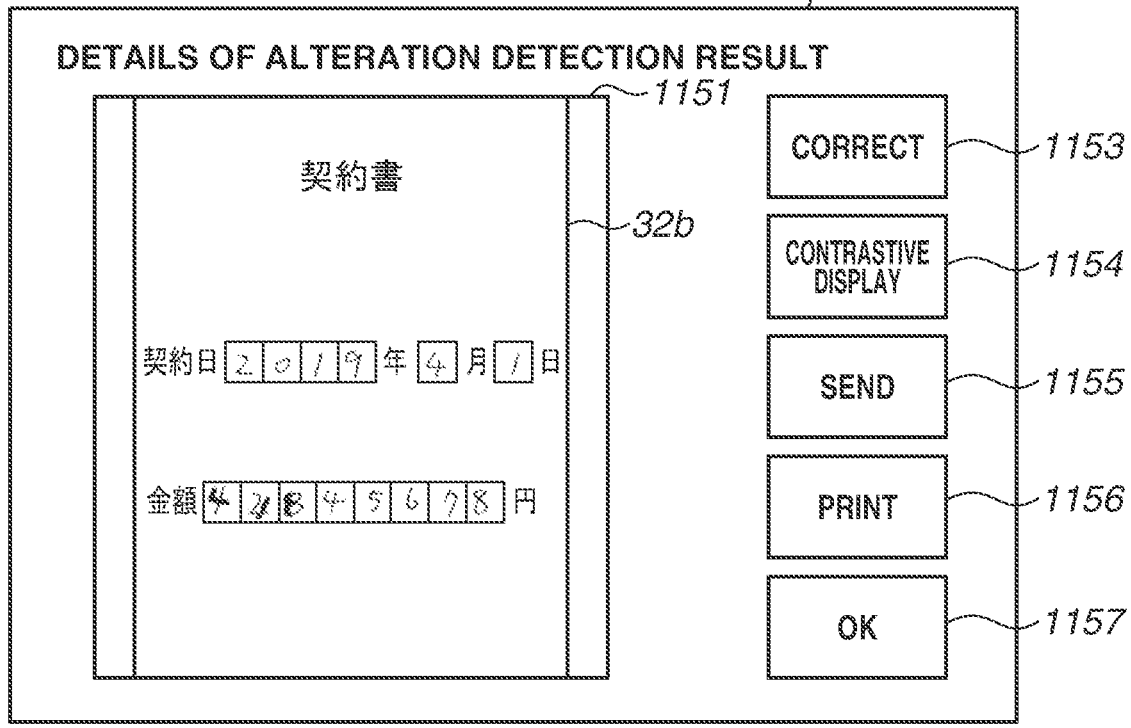
FIG. 11B is a schematic view illustrating an example of a GUI for displaying details of an alteration detection result.

FIGS. 11A and 11B are schematic views illustrating examples of GUIs for displaying a list of alteration detection results and details of an alteration detection result. This GUI can be displayed on the screen of the display device 210 under the control of the display control unit 112. A list window 1100 illustrated in FIG. 11A includes a list area 1101, a Change File Name button 1103, a Folder Distribution button 1104, and an OK button 1105. The list area 1101 displays a list of three list items 1102a, 1102b, and 1102c corresponding to the alteration detection results of the three different target documents. Each list item includes data items "Document ID" for identifying the target document (or the corresponding read image), "Date & Time" indicating when the alteration detection has been performed, and "Presence/Absence of Alternation" indicating whether an alteration has been detected in a document. At the right end of each list item, a read image is previewed. In the example illustrated in FIG. 11A, two target documents having Document ID="Scan1" and "Scan3" are determined to include an altered portion as a result of alteration detection. In contrast, a target document having Document ID="Scan2" is determined not to include an altered portion. The display control unit 112 can determine that a target document where one or more pixels are determined to belong to the altered portion in the detection result image included in the detection result data 32 is "Alteration. Present". When the user operates (e.g., taps) the list item 1102a, the display control unit 112 displays on the screen a detailed window 1150 (FIG. 11B) for displaying the target document identified by Document ID="Scan1". The Change File Name button 1103 triggers an execution of automatic change of the file name of the read image data based on the alteration detection result. If the user operates the Change File Name button 1103, the display control unit 112 automatically changes the file name of the read image data corresponding to the target document of which the check box has been checked. For example, in a case of the read image data of "Alteration Present", the file name the read image data can be applied with a predetermined prefix or postfix (e.g., "Alteration Present") meaning the presence of alteration. In a case of the read image data of "Alteration Absent", the file name may be applied with a predetermined prefix or postfix e.g., Alteration Absent) meaning the absence of alteration. The Folder Distribution button 1104 triggers an execution of automatic folder distribution of the read image data based on the alteration detection result. If the user operates the Folder Distribution button 1104, the display control unit 112 automatically distributes the read image data corresponding to the target document of which the check box has been checked, to one of a plurality of folders. For example, a read image data of "Alteration Present" can be stored in a first folder (e.g., folder name "Alternation Present"). The read image data of "Alteration Absent" can be stored in a second folder (e.g., folder name "Alternation Absent"). When the user operates the OK button 1105, the display control unit 112 ends the display of the list window 1100.

The detailed window 1150 illustrated in FIG. 11B includes an image display area 1151, a Correct button 1153, a Contrastive Display button 1154, a Send button 1155, a Print button 1156, and an OK button 1157. The image display area 1151 is an area for displaying the emphasized image of the target document specified in the list window 1100. In the example illustrated in FIG. 11B, the emphasized image 32b is displayed in the image display area 1151. When the user operates the Correct button 1153, the display control unit 112 displays on the screen a correction window 1200 (described below) for enabling the user to correct the alteration detection result. When the user operates the Contrastive Display button 1154, the display control unit 112 displays on the screen a contrastive display window 1300 or 1350 (described below) in which the emphasized and the comparative images are contrastively arranged. The Contrastive Display button 1154 can become operable only for the target document determined to include the altered portion as a result of the alteration detection. When the user operates the Send button 1155, the display control unit 112 transmits either one or both of the processing target image and the emphasized image of the specified target document to other apparatus. This image transmission may be performed by using any method, such as attachment of the image to an E-mail, and transmission of an E-mail or other messages describing a link of the image on a file server. The transmission destination may be a destination registered in the image processing apparatus 101 or may be specified by the user via a destination pop-up window (not illustrated). When the user operates the Print button 1156, the display control unit 112 instructs the printer device 205 to print either one or both of the processing target image and the emphasized image of the specified target document. When the user operates the OK button 1157, the display control unit 112 ends the display of the detailed window 1150 and redisplays the list window 1100 on the screen.

Figure 12:
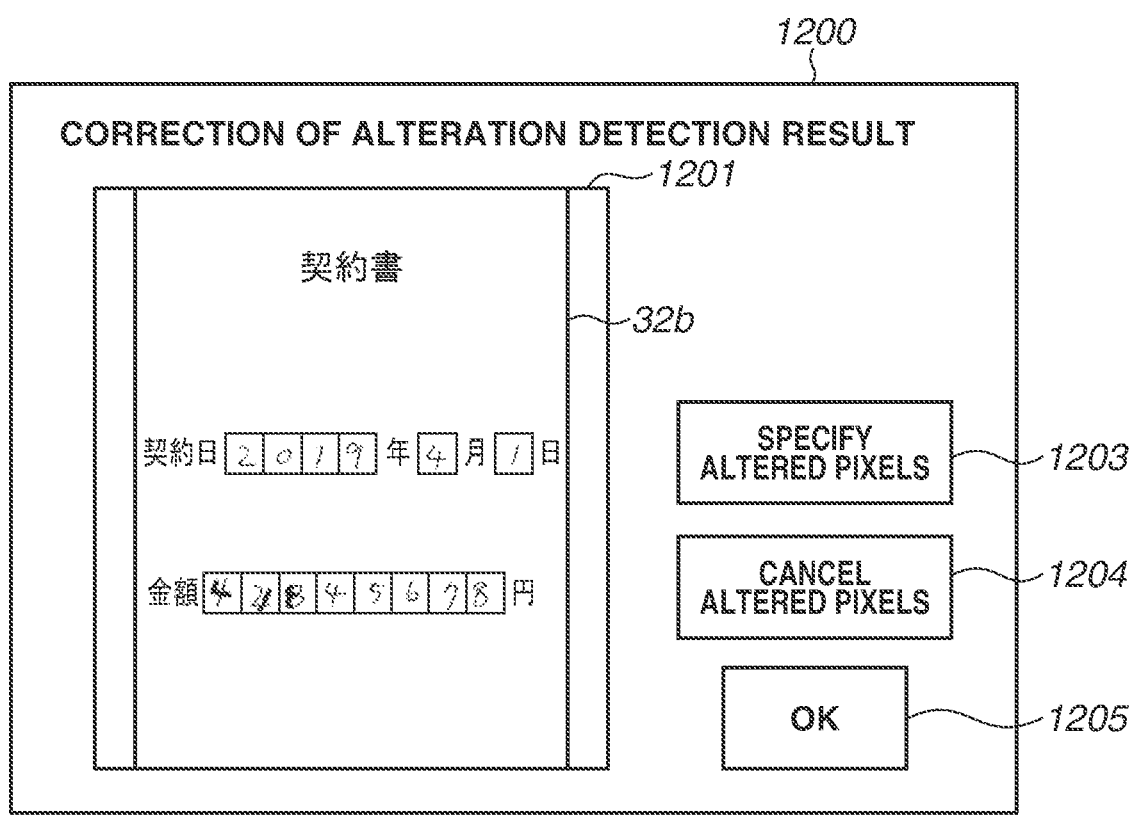
FIG. 12 is a schematic view illustrating an example of a GUI for enabling a user to correct an alteration detection result.

FIG. 12 is a schematic view illustrating an example of a GUI for enabling the user to correct the alteration detection result. This GUI can be displayed on the screen of the display device 210 under the control of the display control unit 112. The correction window 1200 illustrated in FIG. 12 includes an image display area 1201, a Specify Altered Pixels button 1203, a Cancel Altered Pixels button 1204, and an OK button 1205. The image display area 1201 is an area for displaying the emphasized image of the specified target document. In the example illustrated in FIG. 12, the emphasized image 32b is displayed in the image display area 1201. When the user operates the Specify Altered Pixels button 1203, the display control unit 112 changes the pixels specified in the image display area 1201 by the user to the pixels belonging to the altered portion in the alteration detection result. When the user operates the Cancel Altered Pixels button 1204, the display control unit 112 changes the pixels specified in the image display area 1201 by the user to the pixels not belonging to the altered portion in the alteration detection result. When the user operates the OK button 1205, the display control unit 112 reflects the correction of the alteration detection result performed by the user to the detection result data 32 and ends the display of the correction window 1200. When the alteration detection result is corrected in this way by the user, the automatic change of the file name or the automatic folder distribution can be performed based on the corrected alteration detection result. These automatic functions are triggered through the operation of the button 1103 or 1104 in the list window 1100 illustrated in FIG. 11A. This makes it possible to more exactly perform, based on the alteration detection result after the correction, man-powered or systematic document processing (according to the folder name or storage folder) following the validation of the presence or absence of alteration.

When the user corrects the alteration detection result via the above-described correction window 1200, the display control unit 112 may update the learned model based on the alteration detection result after the correction. More specifically, the display control unit 112 transmits a pair of the processing target image and the detection result image after the correction, together with a model update request, to the teaming apparatus 102. Upon reception of the model update request from the display control unit 112, the learning unit 122 of the learning apparatus 102 can update the learned model by using the character area image for each character area in the processing target image as an input image, and the character area image for the identical character area in the detection result image as a teacher image. Thus, relearning is performed for patterns of pixels that are likely to be mis-detected by the current learned model, thereby effectively improving the accuracy of the alteration detection by the learned model.

Figure 13A:
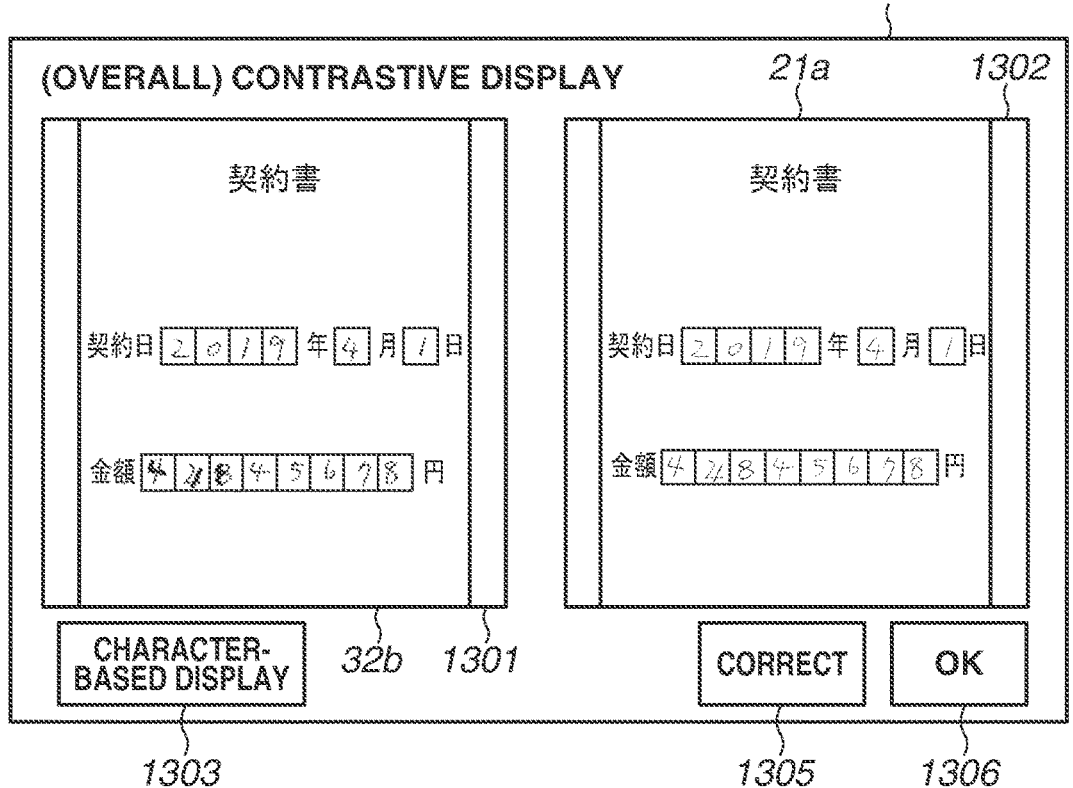
FIG. 13A is a schematic view illustrating a first example of a GUI in which the emphasized and the comparative images are contrastively arranged.

FIG. 13A is a schematic view illustrating a first example of a GUI in which the emphasized and the comparative images are contrastively arranged. This GUI can be displayed on the screen of the display device 210 wider the control of the display control unit 112. In the first example, the GUI displays the emphasized and the comparative images representing the entire target document. The contrastive display window 1300 illustrated in FIG. 13A includes an emphasized image display area 1301, a comparative image display area 1302, a Character-based Display button 1303, a Correct button 1305, and an OK button 1306. In the example illustrated in FIG. 13A, the emphasized image 32b is displayed in the emphasized image display area 1301, and the comparative image 21a is displayed in the comparative image display area 1302. The emphasized image 32b is an image that emphasizes the pixels determined to belong to the altered portion in the read image of the target document. The comparative image 21a, which is identical to the processing target image 21a, represents the pixels determined to belong to the altered portion as it is (without emphasis) in the read image. When the user operates the Character-based Display button 1303, the display control unit 112 changes the screen to the contrastive display window 1350 (described below) in which the emphasized and the comparative images clipped for each character area are contrastively arranged. When the user operates the Correct button 1305, the display control unit 112 displays on the screen the above-described correction window 1200, which enables the user to correct the alteration detection result. When the user operates the OK button 1306, the display control unit 112 ends the contrastive display.

Figure 13B:
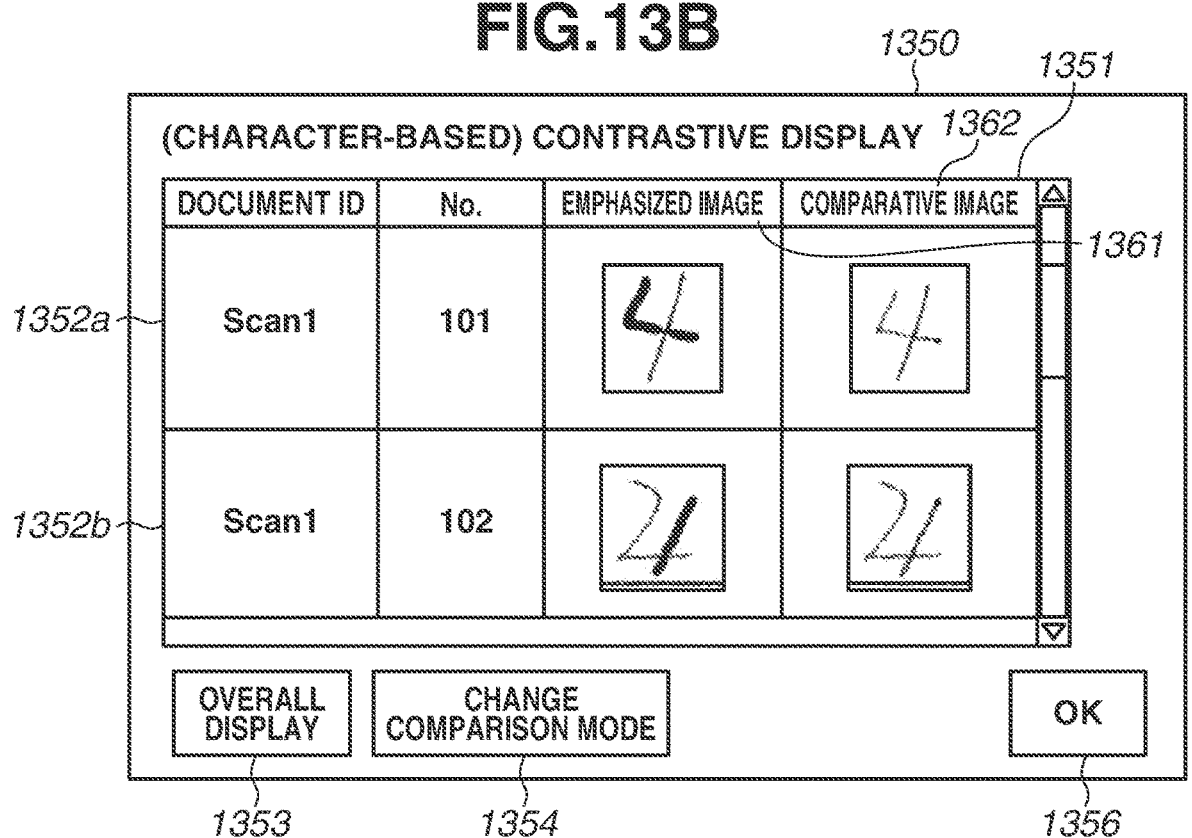
FIG. 13B is a schematic view illustrating a second example of a GUI in which the emphasized and the comparative images are contrastively arranged.

FIG. 13B is a schematic view illustrating a second example of a GUI in which the emphasized and the comparative images are contrastively arranged. This GUI can be displayed on the screen of the display device 210 under the control of the display control unit 112. In the second example, the GUI displays the emphasis and the comparative images as Character-based partial images (character area image). The contrastive display window 1350 illustrated in FIG. 13B includes a list area 1351, an Overall Display button 1353, a Change Comparison Mode button 1354, and an OK button 1356. The list area 1351 displays, in list form, character areas of one or more characters recognized in the target document in a vertically scrollable way. In the example illustrated in FIG. 13B, two list items 1352a and 1352b are displayed in the list area 1351. Each list item can be uniquely identified by the combination of the document ID of the target document and the number ("No.") given to each character area. The list area 1351 includes an emphasized image display area 1361 at the center and a comparative image display area 1362 at the right end. Each emphasized image display area 1361 displays a partial image of one character area in the emphasized image including the emphasized altered portion. In this case, the partial image is also referred to as an emphasized image. Each comparative image display area 1362 displays a partial image of one character area in the processing target image including the altered portion not emphasized. In this case, the partial image is also referred to as a comparative image. However, the contents of the comparative image displayed in the comparative image display area 1362 may change depending on a comparison mode (described below). When the user operates (e.g., taps) the emphasized image display area 1361 or the comparative image display area 1362, the display control unit 112 displays on the screen a correction window 1500 (described below), which enables the user to correct the alteration detection result for each character area. When the user operates the Overall Display button 1353, the display control unit 112 changes the screen to the above-described contrastive display window 1300. When the user operates the Change Comparison Mode button 1354, the display control unit 112 changes the comparison mode setting depending on a user input (described below). When the user operates the OK button 1356, the display control unit 112 ends the contrastive display.

The display control unit 112 may support only a single comparison mode or dynamically switch the comparison mode for contrastive display between candidates of a plurality of comparison modes. In the case of the single comparison mode, the contrastive display window 1350 does not need to include the Change Comparison Mode button 1354. In the case of switching the comparison mode for contrastive display, candidates of the comparison modes can include, for example, two or more of the following modes:

Comparison mode C1: The comparative image is an image of the character area including an altered portion not emphasized.

Comparison mode C2: The comparative image includes the character area including an altered portion not emphasized, and the peripheral area of the character area.

Comparison mode C3: The comparative image includes an image of another character area representing an identical character to the character represented by the emphasized image.

Comparison mode C4: The comparative image is an image of the character area including an altered portion suppressed or undisplayed.

The display control unit 112 may display on the screen a list of candidates of these comparison modes to enable the user to specify a desired comparison mode. Alternatively, the setting of the comparison mode may be toggled (sequentially changed) in a predetermined order by every user operation of the Change Comparison Mode button 1354. The display control unit 112 can change the contents of the comparative image to be displayed in the comparative image display area 1362 in the contrastive display window 1350 according to the comparison mode specified by the user in this way.

FIG. 14A illustrates an example of a comparative image in the comparison mode C1. A comparative image 1401 illustrated in FIG. 14A is an image clipped from the processing target image with the same position and the same size as the character area of the character represented by the corresponding emphasized image. In the comparative image 1401, the altered portion is not emphasized but represented as it is in the read image generated by reading the target document. The comparison mode C1 enables the user to grasp at a glance the correspondence between portions of character compositions in the emphasized and the comparative images.

FIG. 14B illustrates an example of a comparative image in the comparison mode C2. A comparative image 1402 illustrated in FIG. 14B is an image clipped form the processing target image including the peripheral area of the comparative image 1401. In addition, in the comparative image 1402, the altered portion is not emphasized but represented as it is in the read image generated by reading the target document. The comparison mode C2 enables the user to evaluate factors, such as a tint, shading, and stroke features, through the characters before and after the character suspected for alteration, thus validating the alteration detection result.

FIG. 14C illustrates an example of a comparative image in the comparison mode C3. The comparison mode C3 enables the user to display, for example, the comparative images 1401 and 1403 in the comparative image display area 1362 in the contrastive display window 1350. The comparative image 1403 is an image of another character area representing an identical character to the character represented in the character area of the corresponding emphasized image. The display control unit 112 can determine whether two characters input at different positions are identical, for example, based on the OCR result. In addition, in the comparative image 1403, the altered portion is not emphasized but represented as it is in the read image generated by reading the target document. The comparison mode C3 enables the user to refer to factors, such as a tint, shading, and stroke features, of the identical character to the character suspected for alteration, thus validating the alteration detection result.

FIG. 14D illustrates an example of a comparative image in the comparison mode C4. A comparative image 1404 illustrated in FIG. 14D is an image clipped from the processing target image with the same position and the same size as the character area of the character represented by the corresponding emphasized image. However, unlike the comparative image 1401, the altered portion in the comparative image 1404 is suppressed or undisplayed. The comparison mode C4 enables the user to view the contents of the document in a state where there are no strokes that may have possibly be added through the alteration, and validate the alteration detection result by focusing only the pixels determined not to belong to the altered portion.

Figure 15:
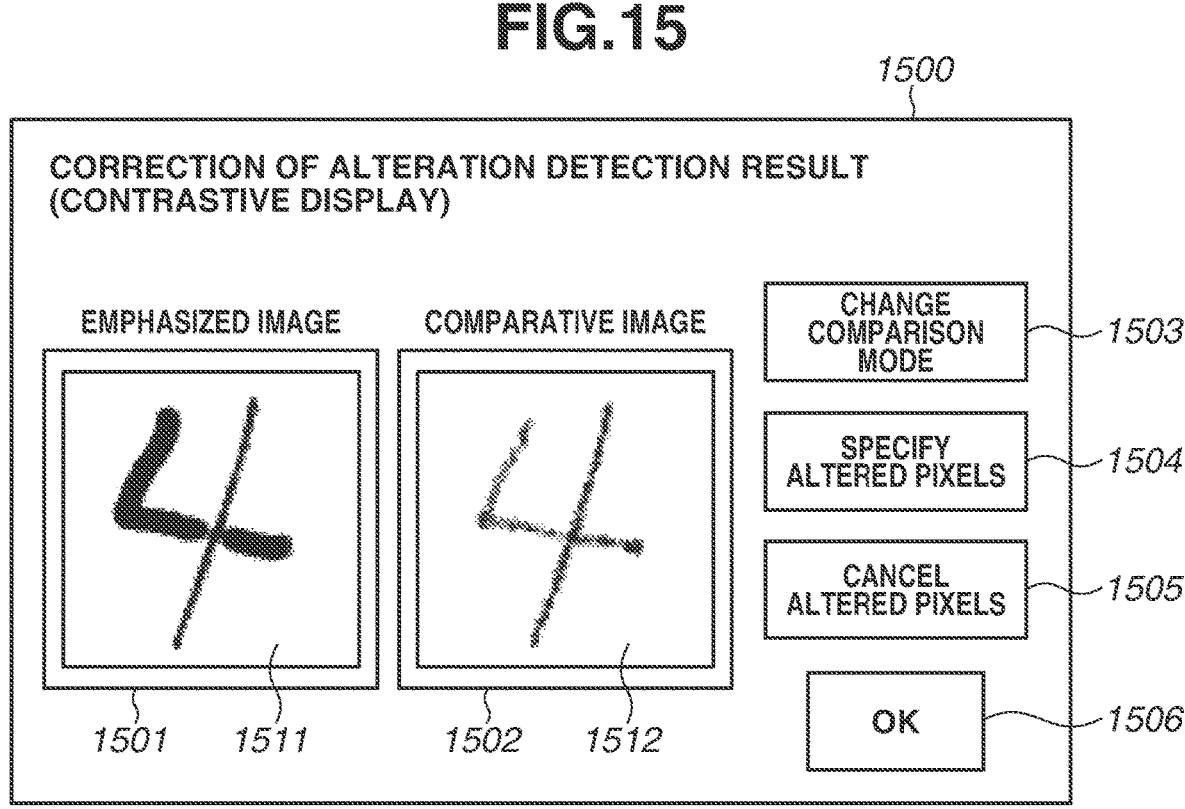
FIG. 15 is a schematic view illustrating another example of a GUI for enabling the user to correct an alteration detection result.

FIG. 15 is a schematic view illustrating another example of a GUI for enabling the user to correct the alteration detection result. This GUI can be displayed on the screen of the display device 210 under the control of the display control unit 112. The correction window 1500 illustrated in FIG. 15 includes an emphasized image display area 1501, a comparative image display area 1502, a Change Comparison Mode button 1503, a Specify Altered Pixels button 1504, a Cancel Altered Pixels button 1505, and an OK button 1506. The emphasized image display area 1501 is an area for displaying the emphasized image of the character area in the specified target document. In the example illustrated in FIG. 15, an emphasized image 1511 is displayed in the emphasized image display area 1501. The comparative image display area 1502 is an area for displaying the comparative image of the character area in the specified target document. In the example illustrated in FIG. 15, a comparative image 1512 is displayed in the comparative image display area 1502. In this example, the above-described comparison mode C1 is set. When the user operates the Change Comparison Mode button 1503, the display control unit 112 changes the setting of the comparison mode between the candidates of the above-described two or more comparison modes, and displays the comparative image corresponding to the newly set comparison mode in the comparative image display area 1502. When the user operates the Specify Altered Pixels button 1504, the display control unit 112 changes the pixels specified in the emphasized image display area 1501 by the user to the pixels belonging to the altered portion in the alteration detection result. When the user operates the Cancel Altered Pixels button 1505, the display control unit 112 changes the pixels specified in the emphasized image display area 1501 by the user to the pixels not belonging to the altered portion in the alteration detection result. When the user operates the OK button 1506, the display control unit 112 reflects the correction of the alteration detection result by the user to the detection result data 32 and ends the display of the correction window 1500.

Figure 16:
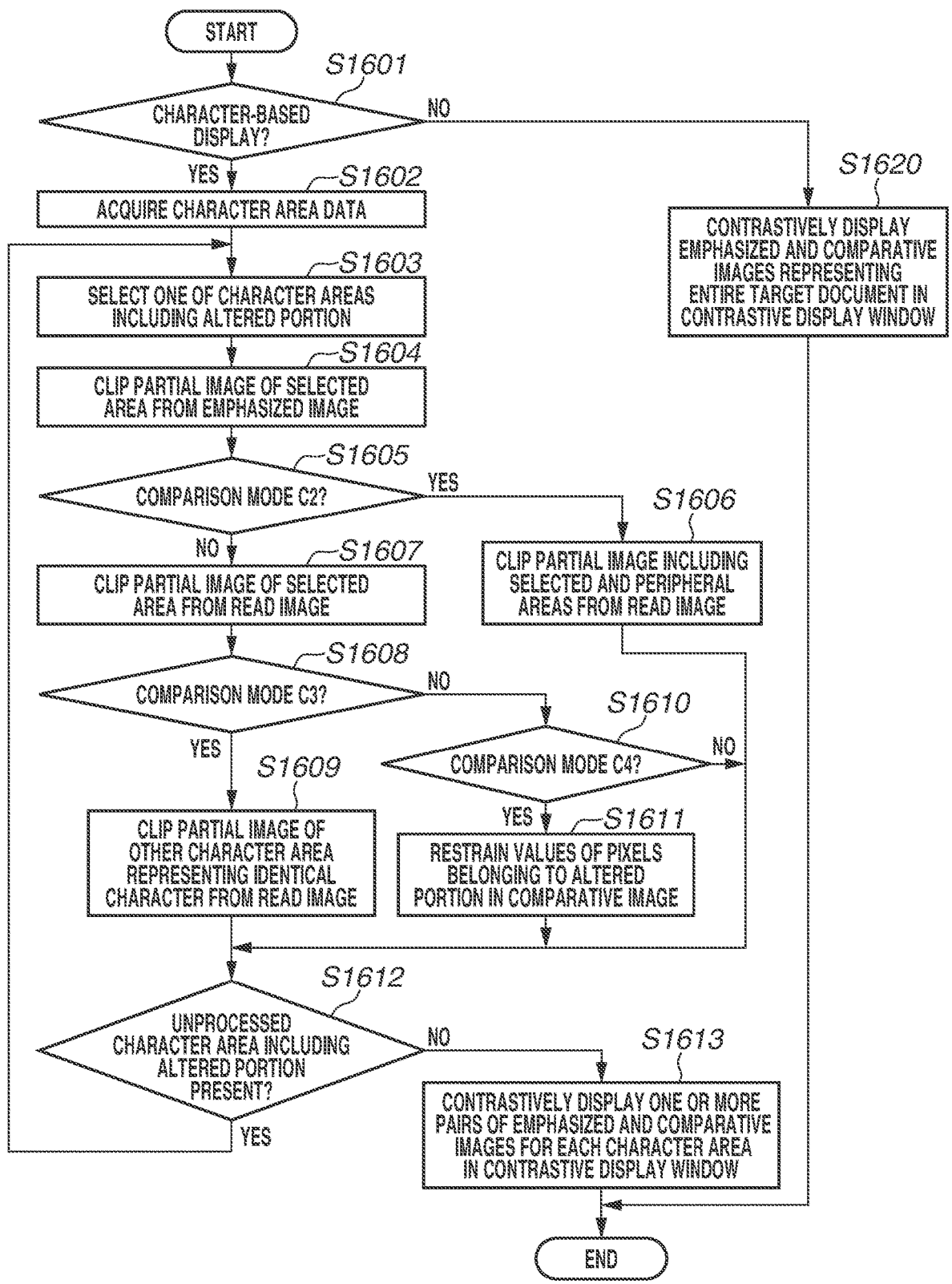
FIG. 16 is a flowchart illustrating an example of a specific display control processing flow performed by the image processing apparatus when an alteration is detected in the target document.

FIG. 16 is a flowchart illustrating an example of a specific display control processing flow performed by the image processing apparatus 101 when an alteration in the target document is detected. The processing illustrated in FIG. 16 is performed by the image processing apparatus 101 under the control of the CPU 201, which executes the controller program loaded from the storage 208 into the RAM 204. The processing can be equivalent to step S807 illustrated in FIG. 8.

In step S1601, the display control unit 112 determines which of the character-based contrastive display and the overall contrastive display is specified as the display mode for the contrastive display. For example, when the user operates the Contrastive Display button 1154 of the detailed window 1150 illustrated in FIG. 11B or the Overall Display button 1353 of the contrastive display window 1350 illustrated in FIG. 13B, the display control unit 112 can determine that the overall contrastive display is specified. In contrast, when the user operates the Character-based Display button 1303 of the contrastive display window 1300 illustrated in FIG. 13A, the display control unit 112 can determine that the character-based contrastive display is specified. If the display control unit 112 determines that the character-based contrastive display is specified (YES in step S1601), the processing proceeds to step S1602. In contrast, if the display control unit 112 determines that the overall contrastive display is specified (NO in step S1601), the processing proceeds to step S1620.

In step S1602, the display control unit 112 acquires character area data representing the positions and sizes of one or more character areas in the image. For example, the display control unit 112 may receive, as character area data, the recognition result data 31 indicating the result of the character recognition performed by the OCR server 104, together with the detection result data 32, from the alteration detection server 103. Alternatively, if the target document is a form having a known format, the display control unit 112 may acquire character area data, which includes predefined positions and sizes of the character areas, included in the known format from the storage 208. Subsequent steps S1603 and S1612 are repeated for each character area including the pixels determined to belong to the altered portion based on the detection result data 32, the character area being included in the character areas indicated by the character area data. Referring to the processing target image 21a and the detection result image 32a illustrated in FIG. 7A, for example, the character area 701a and the two adjacent square character areas to the right of the character area 701a are character areas including the pixels determined to belong to the altered portion. Thus, steps S1603 to S1612 are repeated for the three character areas.

In step S1603, the display control unit 112 selects one of the character areas including the altered portion. Hereinafter, the selected character area is referred to as a selected area. In step S1604, the display control unit 112 clips a partial image of the selected area from the emphasized image according to the position and size indicated in the character area data. In step S1605, the display control unit 112 determines whether the currently set comparison mode is the comparison mode C2. If the comparison mode C2 is currently set (YES in step S1605), the processing proceeds to step S1606. If the comparison mode C1, C3 or C4 is currently set (NO in step S1605), the processing proceeds to step S1607. In step S1606, the display control unit 112 clips a partial image including the selected area and the peripheral area outside the selected area, from the read image. As an example, the size of the partial image including the peripheral area may be W times the size of the selected area in the horizontal direction and H times the size of the selected area in the vertical direction (the magnifications W and H are larger than a preset value of 1, e.g., W=4 and H=2). As another example, the peripheral area may be dynamically set as an area including N characters (N is a preset integer) in the vicinity of the selected area. In the comparison mode C2 (YES in step S1605), the partial image clipped in step S1606 serves as a comparative image. In the comparison mode C1, C3 or C4 (NO in step S1605), the processing proceeds to step S1607. In step S1607, the display control unit 112 clips a partial image of the selected area from the read image. In a case where the comparison mode C1 is currently set, the partial image clipped in step S1607 serves as a comparative image. In a case where the comparison mode C3 is currently set (YES in step S1608), the processing proceeds to step S1609. In step S1609, the display control unit 112 clips, from the read image, a partial image of other one or more character areas representing the identical character to the character represented in the selected area. The other character area is desirably an area not including the pixels determined to belong to the altered portion. The display control unit 112 may request the OCR server 104 to perform the OCR and identify another character area representing the identical character to the character represented in the selected area, based on the character recognition result returned from the OCR server 104. If such other character areas do not exist in the target document, step S1609 may be skipped. In the comparison mode C3, a combination of the partial images clipped in steps S1607 and S1609 (e.g., an image including two partial images arranged side by side) serves a comparative image. In a case where the comparison mode C4 is currently set (NO in step S1608, YES in step S1610), the processing proceeds to step S1611. In step S1611, the display control unit 112 suppresses the values of the pixels determined to belong to the altered portion the partial image clipped in step S1607. An example of the suppression is that the display control unit 112 corrects the pixel values to the same color as the background color, such as white, or a color close to the background color. In the comparison mode C4, the partial image processed in this way serves as a comparative image. In step S1612, the display control unit 112 determines whether there remains an unprocessed character area including the pixels determined to belong to the altered portion. If there remains such an unprocessed character area (YES in step S1612), the processing returns to step S1603. The display control unit 112 then repeats the above-described steps S1603 to S1611 for the next character area. If there remains no unprocessed character area (NO in step S1612), the processing proceeds to step S1613.

In step S1613, the display control unit 112 contrastively displays one or more pairs of the emphasized and the comparative images for each character area in the contrastive display window. Such character-based contrastive display enables the user to grasp which portion of each character composition is likely to be altered based on the emphasized image, and to determine whether each character has been altered by checking the tint or shading of the relevant portion in the comparative image.

In step S1620, the display control unit 112 contrastively displays the emphasized image and the comparative image (read image) representing the entire target document in the contrastive display window. As described above, the present exemplary embodiment enables smooth switching between the overall contrastive display representing the entire document and the character-based contrastive display described above. The user can thereby switch between the schematic grasp of which position's character in the document is likely to be altered in the overall display and the validation of each individual character in the character-based display, and thus the user can efficiently validate the alteration detection result through the target document.

In FIG. 16, the display control unit 112 utilizes the emphasized image received from the alteration detection server 103. However, the display control unit 112 may generate an emphasized image from the processing target image (read image) based on the alteration detection result.

5. Modifications

The exemplary embodiment has been described above centering mainly on a technique for applying the character area image in each character area to the learned model to determine whether each pixel in the character area belongs to an altered portion. However, the technique for alteration detection is not limited to the above-described example. For example, as a first modification, the alteration detection may be performed not on a pixel basis but on a character basis. The character-based alteration detection can utilize, for example, a learned model generated and/or updated by using a flag indicating whether each character area includes the altered portion, as teacher data, instead of using a teacher image (e.g., the binary image 612 illustrated in FIG. 6C) indicating whether each pixel belongs to the altered portion. The learned model may be any determination type model that outputs a bit indicating whether one character area image (input image) includes the altered portion. For example, Visual Geometry Group (VGG) which is a type of a neural network model may be utilized.

Figure 17:
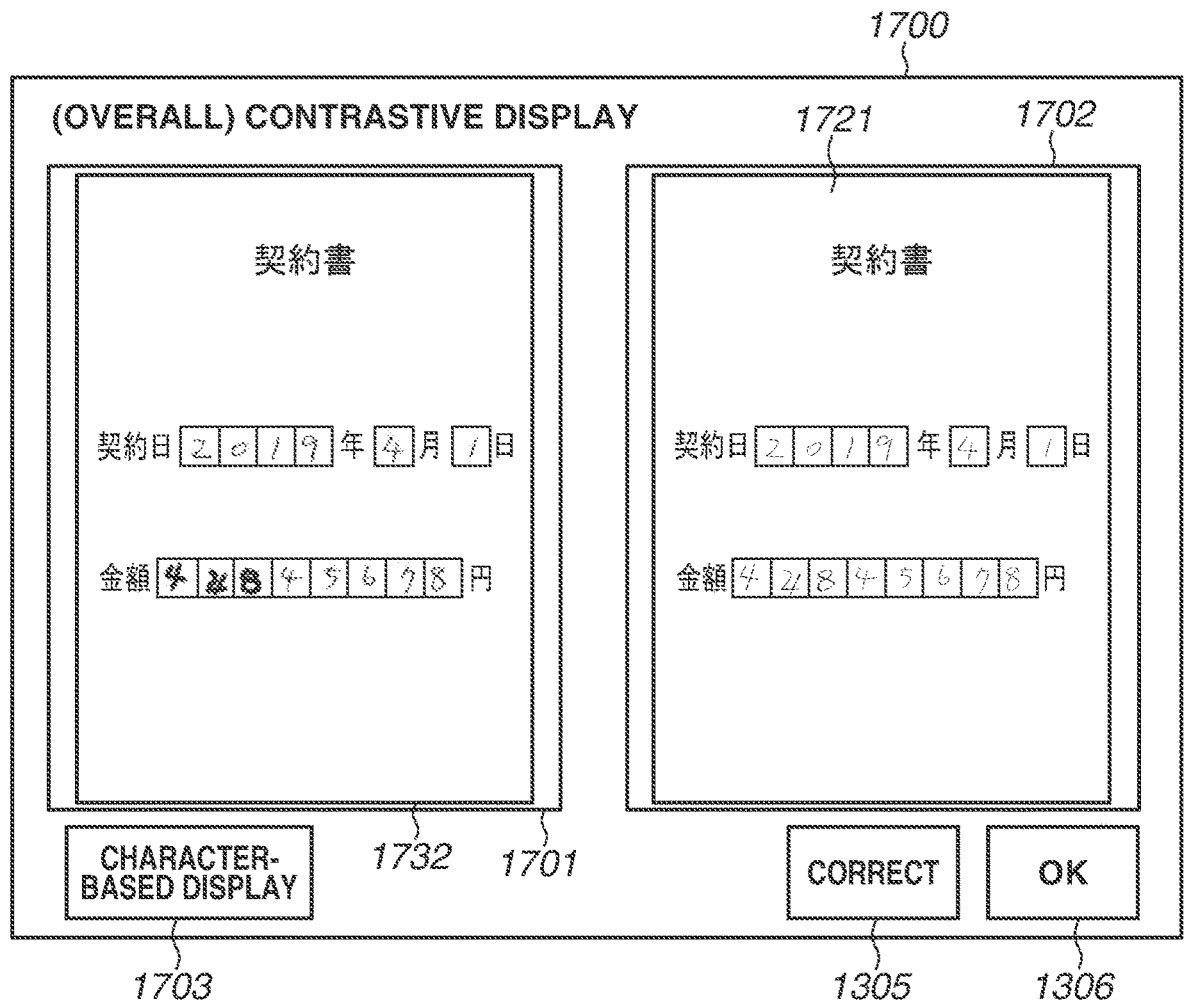
FIG. 17 is a schematic view illustrating an example of a GUI in which the emphasized and the comparative images are contrastively arranged according to a modification.

FIG. 17 illustrates an example of a GUI in which the emphasized and the comparative images are contrastively arranged based on the result of the alteration detection for each character according to the first modification. A contrastive display window 1700 illustrated in FIG. 17 includes an emphasized image display area 1701, a comparative image display area 1702, a Character-based Display button 1703, a Correct button 1305, and an OK button 1306. In the example illustrated in FIG. 17, an emphasized image 1732 is displayed in the emphasized image display area 1701, and a comparative image 1721 is displayed in the comparative image display area 1702. The emphasized image 1732 is an image that emphasizes the characters in the character areas determined to include the altered portion in the read image of the target document. The comparative image 1721 is identical to the processing target image 21a. The comparative image 1721 is an image representing the characters in the character areas determined to include the altered portion as it is (without emphasis) in the read image. When the user operates the Character-based Display button 1703, the display control unit 112 may change the screen to the contrastive display window (not illustrated) in which the emphasized and the comparative images clipped for each character area are contrastively arranged.

In a second modification, the alteration detection may be performed by using an autoencoder type model (e.g., Variational Autoencoder (VAE)) for encoding a character area image to extract the feature quantity of the character, instead of using the determination type model. The learning processing of the VAE includes encoder processing for calculating a dimension decreased feature quantity based on the input image, and decoder processing for restoring the input image based on the calculated feature quantity. An encoder has a neural network structure, and a decoder has an inverse structure of the encoder. A model error is evaluated as the difference e.g., cross entropy) between the input and the restored images. The values of the model parameters are adjusted through, for example, the back-propagation method so that the error decreases. In this case, an alteration learning image and teacher data are not used. In the learning stage, the learning apparatus 102 generates and/or updates the learned model for extracting the feature quantity of an unaltered character from the character area image through the learning processing using a plurality of original learning images. Typically, it is not realistic to generate and/or update a single model from which a suitable feature quantity can be extracted for all characters. The learning apparatus 102 can therefore learn the values of different model parameters for each character type. For example, characters "1", "2" and "3" may be handled as different character types. In the alteration detection stage, for example, the alteration detection server 103 applies each character area image to the encoder of the learned model corresponding to the character type recognized as a result of the OCR and extracts the feature quantity from the character area image. The alteration detection server 103 acquires a reference feature quantity pre-extracted for a known unaltered character area image having the same character type. If the difference between the two feature quantities satisfies a predetermined condition (e.g., if the Manhattan distance is equal to or less than a threshold value), the alteration detection server 103 can determine that the character area image does not include an altered portion. In contrast, if the Manhattan distance between the feature quantity extracted from the character area image and the reference feature quantity exceeds the above-described threshold value, the alteration detection server 103 can determine that the character area image includes an altered portion. According to the present modification, like the first modification, the alteration detection server 103 determines whether each of the characters recognized in the processing target image includes an altered portion (i.e., character-based alteration detection). The contrastive display of the emphasized and the comparative images according to the present modification can be performed similar to the example described above with reference to FIG. 17.

The above-described exemplary embodiment centers mainly on an example where the emphasized and the comparative images are horizontally arranged in the contrastive display window. However, the emphasized and the comparative images may be arranged in any desired direction other than the horizontal direction. The emphasized and the comparative images may also be displayed in different windows. As a third modification, the emphasized and the comparative images may also be displayed at different timings instead of being spatially and contrastively arranged. For example, the emphasized image display for X seconds and the comparative image display for X seconds may be alternately and repetitively performed in a single image display area. The term "contrastive display" according to the present specification includes all of these display modes.

6. Summary

Exemplary embodiments of the present disclosure have been described in detail above with reference to FIGS. 1 to 17. According to the above-described the exemplary embodiment, the altered portion included in the target document is detected by using the read image of the target document, and the emphasized image that emphasizes the altered portion in the read image and the comparative image that represents the altered portion as it is in the read image are contrastively displayed on the screen. When the user validates the alteration detection result, the above-described configuration enables clearly presenting to the user which portion in the image is likely to be altered, and at the same time presenting to the user the original tint and shading of the relevant portion in the comparative image. This enables the user to grasp the position of the altered portion and easily validate the detection result based on the tint or shading of the relevant portion.

The above-described exemplary embodiment makes it possible to contrastively display the emphasized and the comparative images according to a comparison mode selected by the user from the two or more comparison modes having different contents of the comparative image. A first comparison mode enables the user to instantly grasp the correspondence between portions of character compositions in the emphasized and the comparative images. A second comparison mode enables the user to evaluate factors, such as a tint, shading, and stroke features, based on the characters before and after the character that is likely to be altered, thus validating the alteration detection result. A third comparison mode enables the user to refer to factors, such as a tint, shading, and stroke features, of the identical character (in another character area) to the character that is likely to be altered, thus validating the alteration detection result. A fourth comparison mode enables the user to view the contents of the document in a state where there are no strokes that may have possibly be added through the alteration, and to validate the alteration detection result by focusing only the pixels determined not to belong to the altered portion. Enabling the flexible switching between these comparison modes enables the user to efficiently perform the operation for validating the alteration detection result.

The above-described exemplary embodiment can provide the user with user interfaces that enable the user to correct the alteration detection result indicating which portion of the read image is determined to have been altered. When the user finds a detection error by monitoring the contrastive display of the emphasized and the comparative images, the above-described configuration enables the user to promptly correct the detection error. This makes it possible to smoothly transfer the alteration detection result suitably corrected by the user to man-powered or systematic processing following the validation of the presence or absence of alterations.

A certain exemplary embodiment makes it possible to determine whether each of a plurality of pixels in the read image belongs to an altered portion, and emphasize the pixels determined to belong to the altered portion in the emphasized image. In this case, the detailed alteration detection result can be visually presented to the user. For example, in a case of alteration in which strokes have been added to each individual character, only the strokes are emphasized. A certain modification makes it possible to determine whether each of one or more character areas in the read image includes an altered portion, and emphasize the characters in the character areas determined to include the altered portion in the emphasized image. In this case, since the load of calculation processing required for the alteration detection is low, the alteration detection result can be promptly presented to the user even if the read image has a large amount of data.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-212299, filed Nov. 25, 2019, and Japanese Patent Application No. 2019-212526, filed Nov. 25, 2019, which are hereby incorporated by reference herein in their entirety.

What is claimed is:

1. An image processing system comprising:
one or more computing devices including one or more processors configured to cause the one or more computing devices to:
generate a learned model by performing machine learning processing based on an image including an alteration, an image before the alteration, and an image representing a difference between the image including the alteration and the image before the alteration, the machine learning processing including using the image including the alteration as an input learning image for a machine learning model, and using the image representing the difference between the image including the alteration and the image before the alteration as an output learning image for the machine learning model;
input image data; and
estimate whether an image represented by the image data includes an altered portion by using the learned model.

2. The image processing system according to claim 1, further comprising a display, wherein, when it is estimated that the image represented by the image data includes the altered portion, the one or more processors cause the display to display the image represented by the image data with the altered portion emphasized.

3. The image processing system according to claim 2, wherein the display displays the image represented by the image data with the altered portion not emphasized, together with the image represented by the image data with the altered portion emphasized.

4. The image processing system according to claim 2, wherein the one or more processors are further configured to cause the one or more computing devices to:
receive one or more user inputs;
when a user's specification of pixels in the image represented by the image data displayed by the display is received, determine that the specified pixels are altered pixels based on a user input indicating selection of a first option; and
when a user's specification of pixels in the image represented by the image data displayed by the display is received, determine that the specified pixels are not altered pixels based on a user input indicating selection of a second option.

5. The image processing system according to claim 2, wherein, when it is estimated that the image represented by the image data does not include the altered portion, the one or more processors cause the display to display information indicating that no alteration has been detected.

6. The image processing system according to claim 1, wherein the one or more processors are further configured to cause the one or more computing devices to:
input second image data including a first learning image and a second learning image, the first learning image including an image before an alteration, the second learning image including an image including the alteration,
wherein the learned model is updated by performing machine learning processing based on the image including the alteration included in the second learning image, the image before the alteration included in the first learning image, and an image representing a difference between the image including the alteration included in the second learning image and the image before the alteration included in the first learning image.

7. The image processing system according to claim 6, wherein the one or more processors are further configured to cause the one or more computing devices to, based on specified identification information, determine to update the learned model through the machine learning processing based on the image including the alteration included in the second learning image and the image before the alteration included in the first learning image.

8. The image processing system according to claim 7, wherein the one or more processors are further configured to cause the one or more computing devices to store the learned model and the identification information in an associated way, and
wherein the learned model is determined to correspond to the specified identification information and is updated.

9. The image processing system according to claim 1, wherein the one or more processors are further configured to cause the one or more computing devices to:
input second image data;
determine whether an image represented by the second image data is an image including an alteration or whether the image represented by the second image data is an image before the alteration; and
store the second image data determined to be the image including the alteration represented by the second image data, and the second image data determined to be the image before the alteration represented by the second image data, in an associated way.

10. The image processing system according to claim 9, wherein, based on an identifier included in the second image data, the second image data determined to be the image including the alteration represented by the second image data, and the second image data determined to be the image before the alteration represented by the second image data, are stored in an associated way.

11. The image processing system according to claim 10, wherein the identifier is a two-dimensional code.

12. The image processing system according to claim 1, wherein the image processing system comprises at least an image processing apparatus, a first computing device, and a second computing device,
wherein the image processing apparatus includes one or more processors configured to cause the image processing apparatus to input the image data,
wherein the first computing device includes one or more processors configured to generate the learned model, and
wherein the second computing device includes one or more processors configured to estimate whether the image represented by the image data includes the altered portion by using the learned model.

13. The image processing system according to claim 12, wherein the image processing apparatus is further configured to transmit second image data to the first computing device,
wherein the first computing device is further configured to receive the second image data transmitted from the image processing apparatus, and
wherein the first computing device performs machine learning processing based on the second image data received from the image processing apparatus.

14. The image processing system according to claim 12, wherein the image processing system comprises at least the image processing apparatus, the first computing device, the second computing device, and a third computing device,
wherein the third computing device includes one or more processors configured to perform character recognition processing, and
wherein the second computing device is configured to estimate whether the image represented by the image data includes the altered portion based on the image data input by the image processing apparatus, the learned model generated by the first computing device, and a result of the character recognition processing output by the third computing device.

15. An image processing method comprising:
generating a learned model by performing machine learning processing based on an image including an alteration, an image before the alteration, and an image representing a difference between the image including the alteration and the image before the alteration, the machine learning processing including using the image including the alteration as an input learning image for a machine learning model, and using the image representing the difference between the image including the alteration and the image before the alteration as an output learning image for the machine learning model;
inputting image data; and
estimating whether an image represented by the image data includes an altered portion by using the learned model.

16. A non-transitory computer-readable storage medium storing one or more programs including instructions, which when executed by one or more processors, cause the one or more processors to perform an image processing method, the image processing method comprising:
generating a learned model by performing machine learning processing based on an image including an alteration, an image before the alteration, and an image representing a difference between the image including the alteration and the image before the alteration, the machine learning processing including using the image including the alteration as an input learning image for a machine learning model, and using the image representing the difference between the image including the alteration and the image before the alteration as an output learning image for the machine learning model;
inputting image data; and
estimating whether an image represented by the image data includes an altered portion by using the learned model.

* * * * *